Nov. 1, 1960 W. FORREST 2,958,734

TRUNK-CONNECTED PRIVATE AUTOMATIC BRANCH EXCHANGE

Filed Sept. 29, 1959 12 Sheets-Sheet 2

Nov. 1, 1960 W. FORREST 2,958,734

TRUNK-CONNECTED PRIVATE AUTOMATIC BRANCH EXCHANGE

Filed Sept. 29, 1959 12 Sheets-Sheet 4

Nov. 1, 1960 W. FORREST 2,958,734

TRUNK-CONNECTED PRIVATE AUTOMATIC BRANCH EXCHANGE

Filed Sept. 29, 1959 12 Sheets-Sheet 6

Nov. 1, 1960 W. FORREST 2,958,734

TRUNK-CONNECTED PRIVATE AUTOMATIC BRANCH EXCHANGE

Filed Sept. 29, 1959 12 Sheets-Sheet 7

Nov. 1, 1960 W. FORREST 2,958,734

TRUNK-CONNECTED PRIVATE AUTOMATIC BRANCH EXCHANGE

Filed Sept. 29, 1959 12 Sheets-Sheet 9

INVENTOR.
Wilfrid Forrest
BY C. A. Gulbrandsen
Atty.

TRUNK-CONNECTED PRIVATE AUTOMATIC BRANCH EXCHANGE

United States Patent Office 2,958,734

Patented Nov. 1, 1960

2,958,734

TRUNK-CONNECTED PRIVATE AUTOMATIC BRANCH EXCHANGE

Wilfrid Forrest, Brockville, Ontario, Canada, assignor to Automatic Electric Laboratories, Inc., a corporation of Delaware Filed Sept. 29, 1959, Ser. No. 843,290

13 Claims. (Cl. 179—18)

The present invention relates to telephone systems in general and more particularly to improvements in private automatic branch exchange systems associated with central exchanges by way of two-way trunk lines extending therebetween.

A private automatic branch exchange, or P.A.B.X, conventionally comprises an attendant's cabinet, or operator's station, a number of subscriber substations, a plurality of two-way trunk lines extending between the P.A.B.X and a central exchange (or central office) associated therewith, a plurality of subscriber lines individually extending to subscriber substations and apparatus including a switch-train having access to each of the subscriber and trunk lines which is operated to set up connections between the various subscribers. Usually the apparatus in a P.A.B.X of this type is so connected and arranged that the connections between the various subscriber lines can be set up by the subscribers at the subscriber substations without the assistance of the operator at the attendant's cabinet.

Frequently, the apparatus is also connected and arranged so that a subscriber at one or more of the subscriber substations can initiate an outgoing trunk call from the P.A.B.X on an idle one of the trunk lines without the assistance of the operator at the attendant's cabinet. Universally, when the operator is on duty, incoming trunk calls to the P.A.B.X on the trunk lines are answered by the operator at the attendant's cabinet and then routed to the desired subscriber substation. Usually the attendant's cabinet of a P.A.B.X of this type is provided with a night switch or key which is operated before the operator leaves the attendant's cabinet or goes off duty in order to institute night service.

The main object of the invention is to provide an improved private automatic branch exchange system of the general type such as shown in U.S. Patent No. 2,087,930, issued July 27, 1937 to John H. Voss, by simplifying and reducing the cost thereof without sacrificing any of the desirable operating features, and yet providing new and novel circuit means for accomplishing the various telephone connections.

One of the features of the invention relates to the provision of improved circuit arrangements in the local finder-connector links that are used by local subscribers for extending local calls, outgoing trunk calls, and the transfer of trunk calls.

Another feature of the invention relates to the provision of improved two-way trunk circuits which are used for the purpose of extending incoming trunk calls, outgoing trunk calls by local subscribers, outgoing trunk calls by the operator at the attendant's cabinet and the transfer of calls.

Another feature of the invention is provided during outgoing trunk calls by local subscriber lines whereby the marking of the calling line at the vertical level and bank outlet of the trunk circuit is controlled by means of the extra control (EC) conductors of the local finder-connector link and of the calling local line circuit.

Still another feature of the invention is provided, during outgoing trunk calls by local subscriber lines, whereby the local finder-connector link is released responsive to the trunk circuit finding and connecting with a local line.

A further feature of the invention relates to means whereby the above-mentioned release of the local finder-connector link is controlled over a circuit including the above-mentioned marking, the extra control conductors, and the negative line conductors of the connection.

A further feature of the invention is provided during transfer calls, whereby means in the transfer circuit initiates the release of the engaged trunk circuit in response to a transfer call being accepted by a called line.

Still another feature of the invention resides in the provision of means during transfer calls, whereby the trunk circuit is automatically reoperated subsequent to the above-mentioned release to hunt for and connect with the called accepting subscriber.

Another feature of the invention resides in the provision of means during transfer calls, whereby the above-mentioned marking encountered at the trunk circuit bank outlet is extended by means of the trunk circuit extra control wiper to the negative line conductor of the connection to the local connector for causing the subsequent release thereof in response to the trunk circuit connecting with the called accepting subscriber.

A still further feature of the invention relates to the provision of means during transfer calls for restoring the transfer circuit responsive to the release of the above-mentioned local connector at the time that the trunk circuit connected with the calling accepting subscriber.

Another feature of the invention relates to means in the local connector operated in response to the called accepting subscriber dialling a specific digit for operating trunk circuit release means in the transfer circuit.

Further features of the invention relate to the particular arrangement of the circuit elements thereof, whereby the above-outlined and additional operating features are attained.

The novel features believed to be characteristic of the invention are set forth with particularity in the appended claims. The invention, both as to its organization and method of operation, together with further objects and advantages thereof, will best be understood by reference to the following detailed operational description taken in conjunction with the accompanying drawings comprising Figs. 1 through 12 inclusive, which show, by means of the usual circuit diagrams, a sufficient amount of apparatus to enable the invention to be described and understood. In the drawings, Figs. 11 and 12 illustrate the general trunking arrangement of a telephone system including a private automatic branch exchange incorporating the present invention; and Figs. 1 through 10, inclusive, taken together as called for in the trunking diagram, illustrate the details of a system having incorporated therein the features of the invention as briefly outlined above.

Fig. 1 shows a local line circuit in the upper lefthand corner, with certain conductors extending by means of cables to bank contact outlets in the connector banks and trunk circuit banks and other conductors extending by means of cables to bank contact outlets and vertical banks in the trunk circuits. The lower left-hand portion of Fig. 1 represents the line circuit start and level marking arrangement, while the remainder of Fig. 1 represents the finder portion of a finder-connector link.

Figure 7:
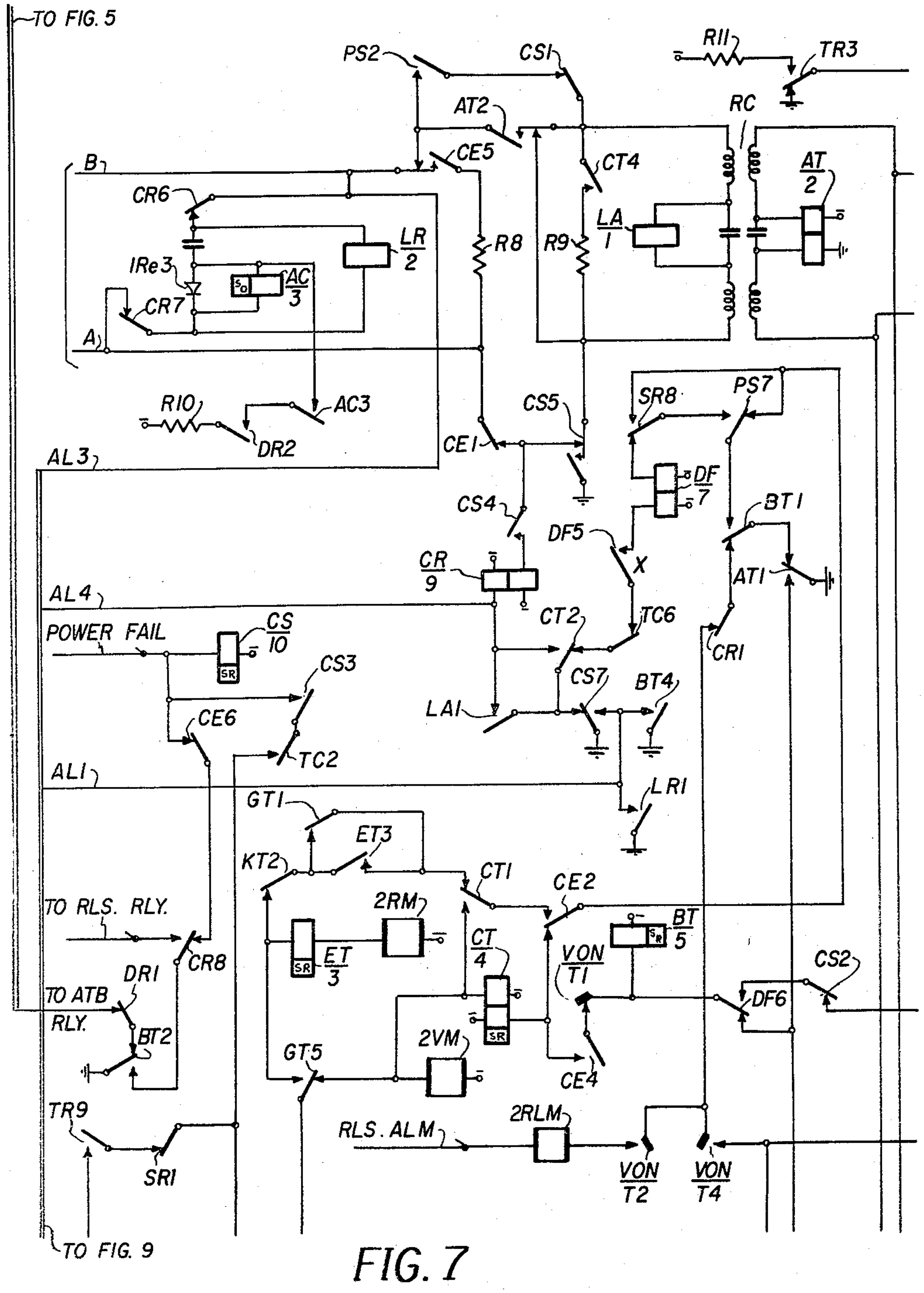
Figure 8:
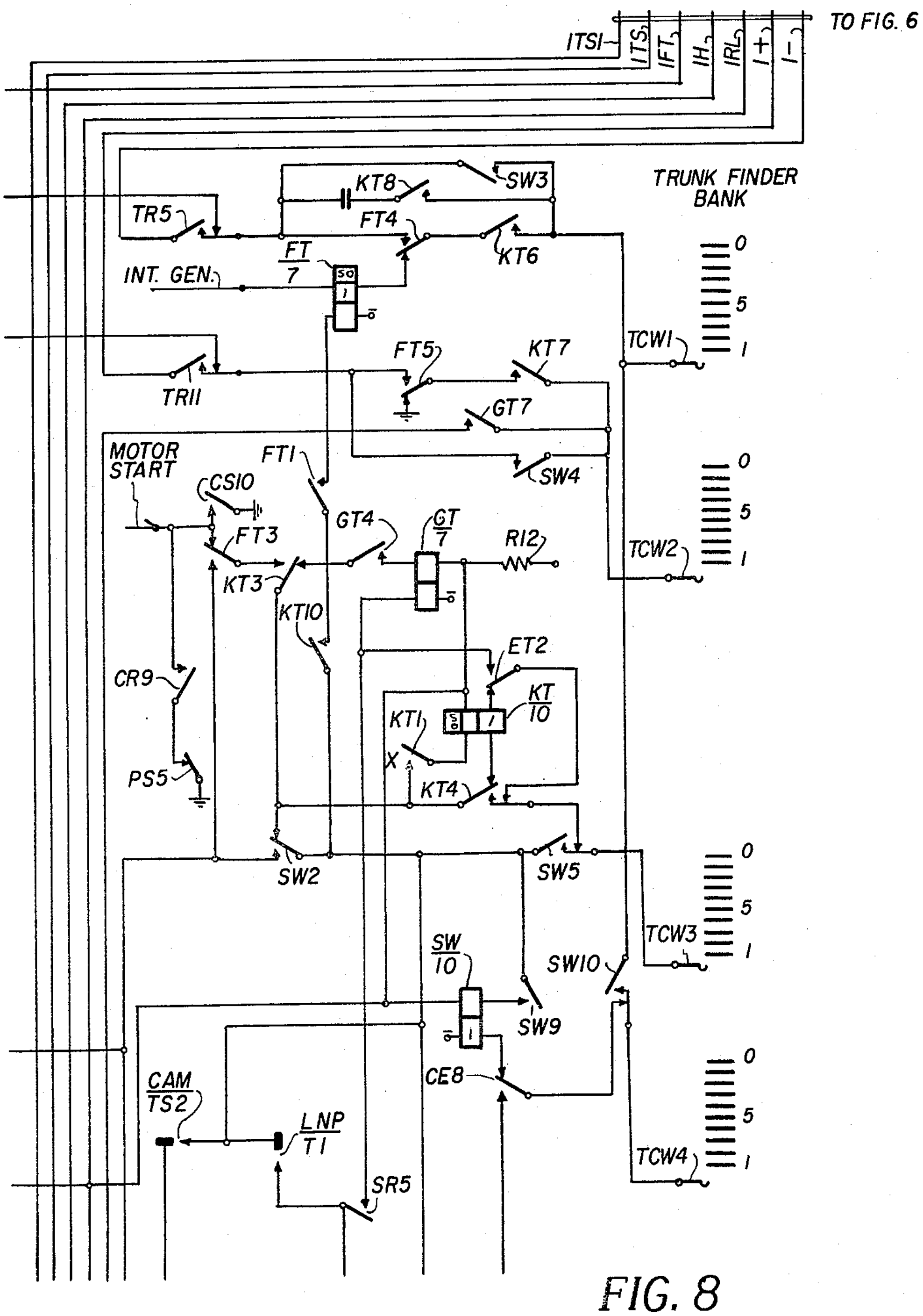
Figure 9:
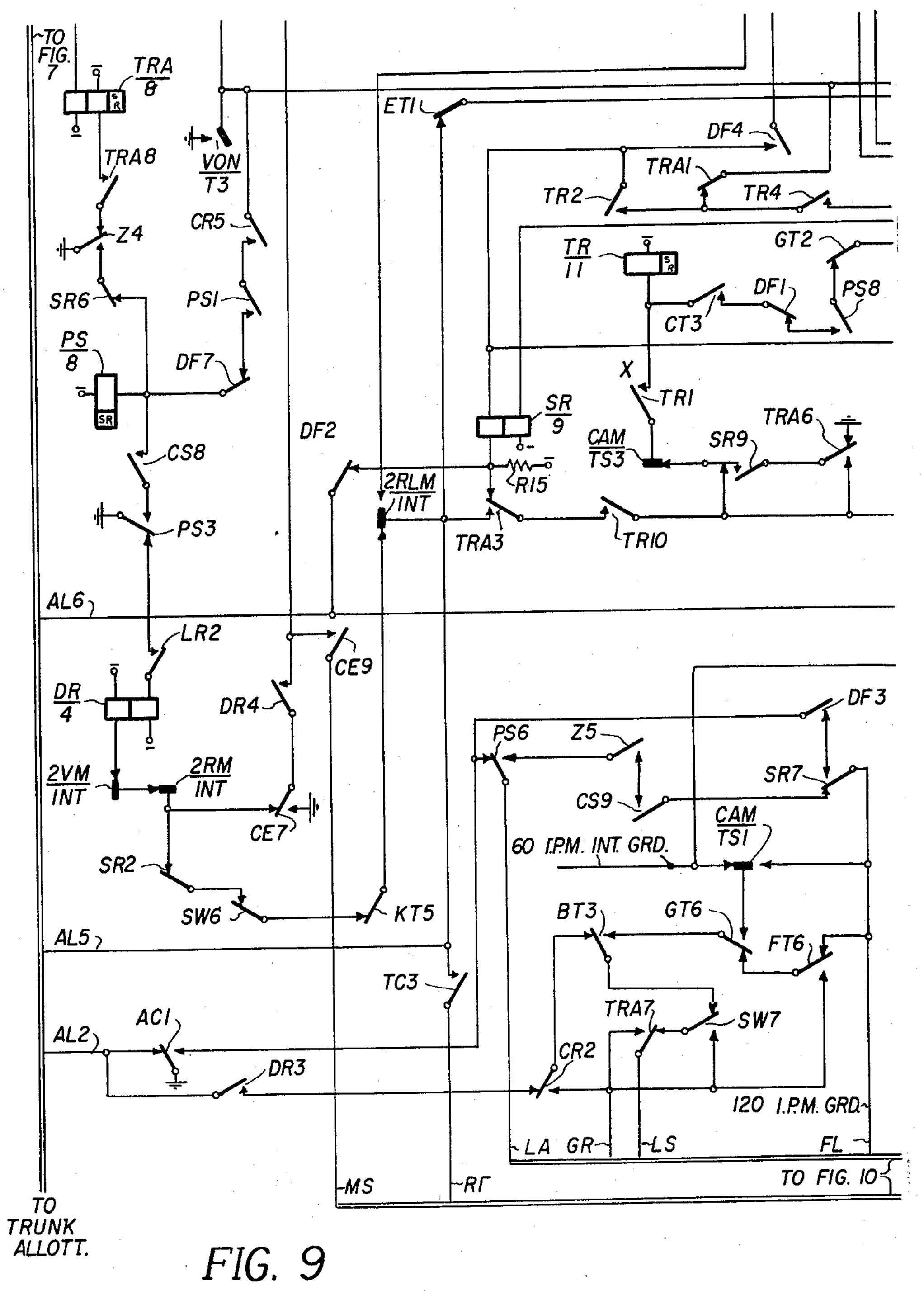
Figure 10:
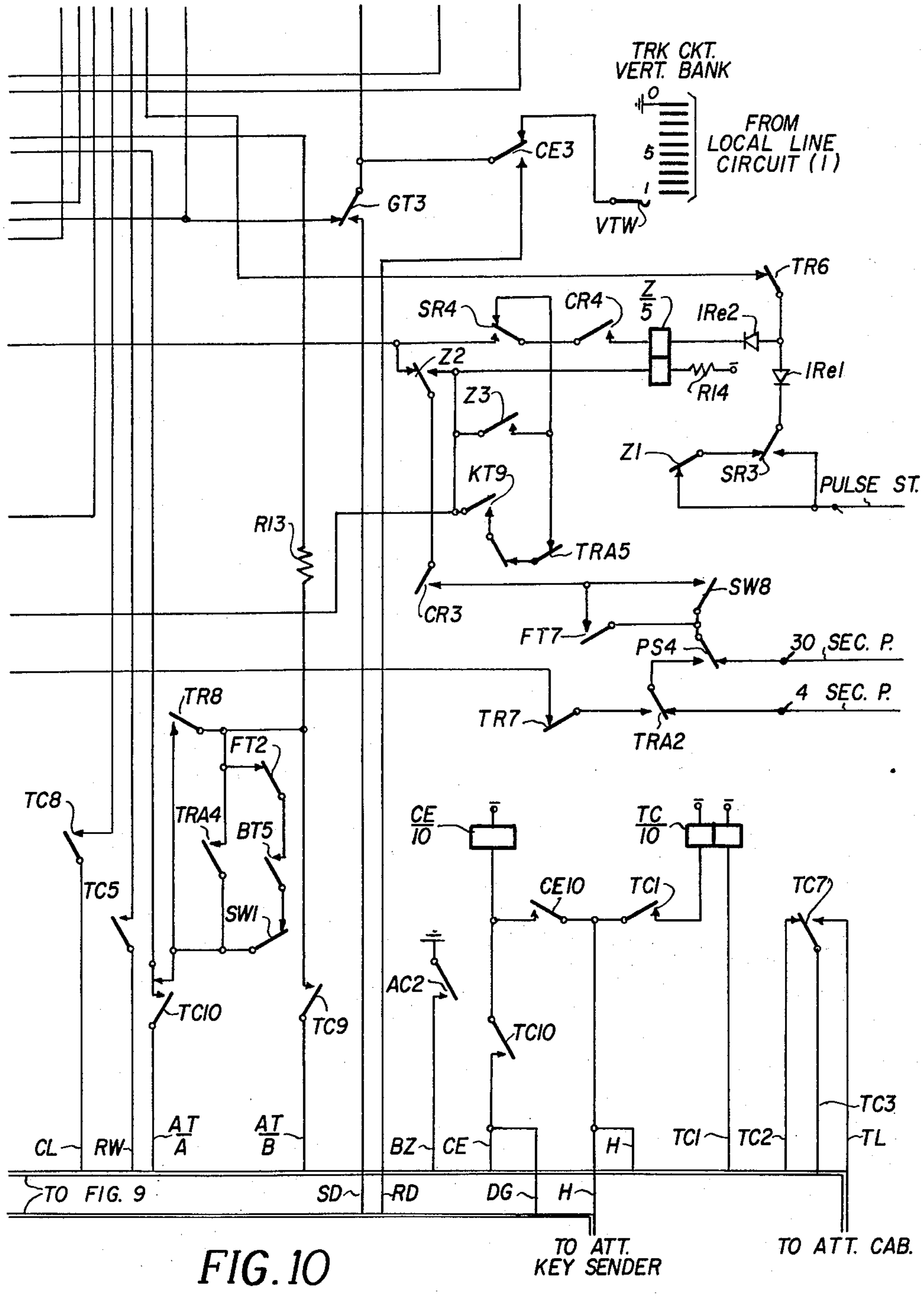

The two-way trunk circuit is disclosed in Figs. 7, 8, 9, and 10; with Fig. 8 being arranged to the right of Fig. 7; Fig. 9 being placed directly below Fig. 7 and Fig. 10 being placed directly below Fig. 8 and to the right of Fig. 9. The upper left-hand corner of Fig. 7 discloses line conductors A and B leading to the central office (not shown). The left-hand portions of Figs. 7 and 9 disclose conductors leading to a cable which extends to contacts accessible by wipers of the trunk allotter (not shown). The right-hand portion of Fig. 8 discloses the trunk circuit wipers which have access to the bank contacts representing connections to all the local lines of the P.A.B.X. The lower sections of Figs. 9 and 10 disclose conductors and associated cables leading to the attendant's cabinet (not shown) and to the attendant's key sender (not shown), respectively.

Figure 11:
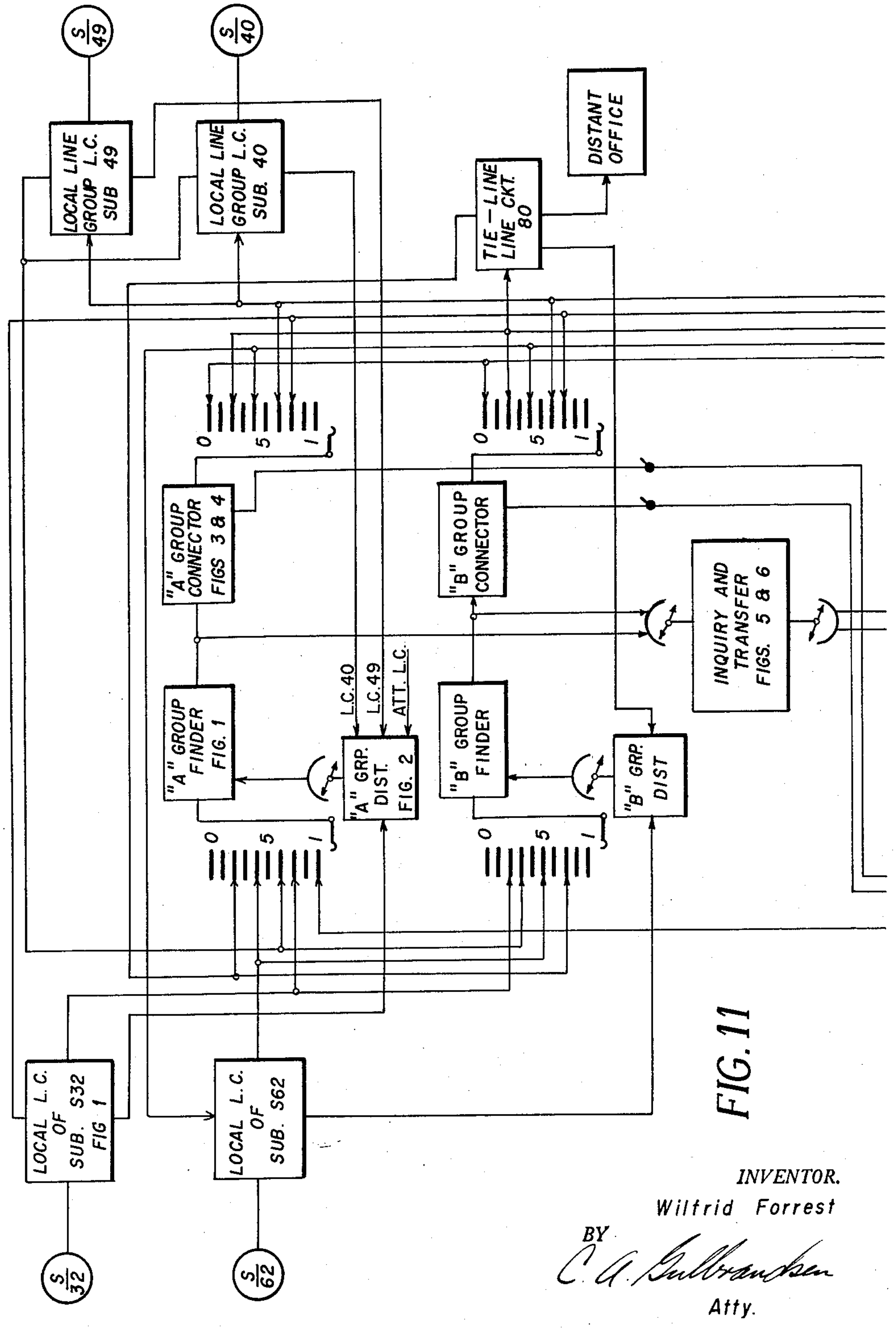
Figure 12:
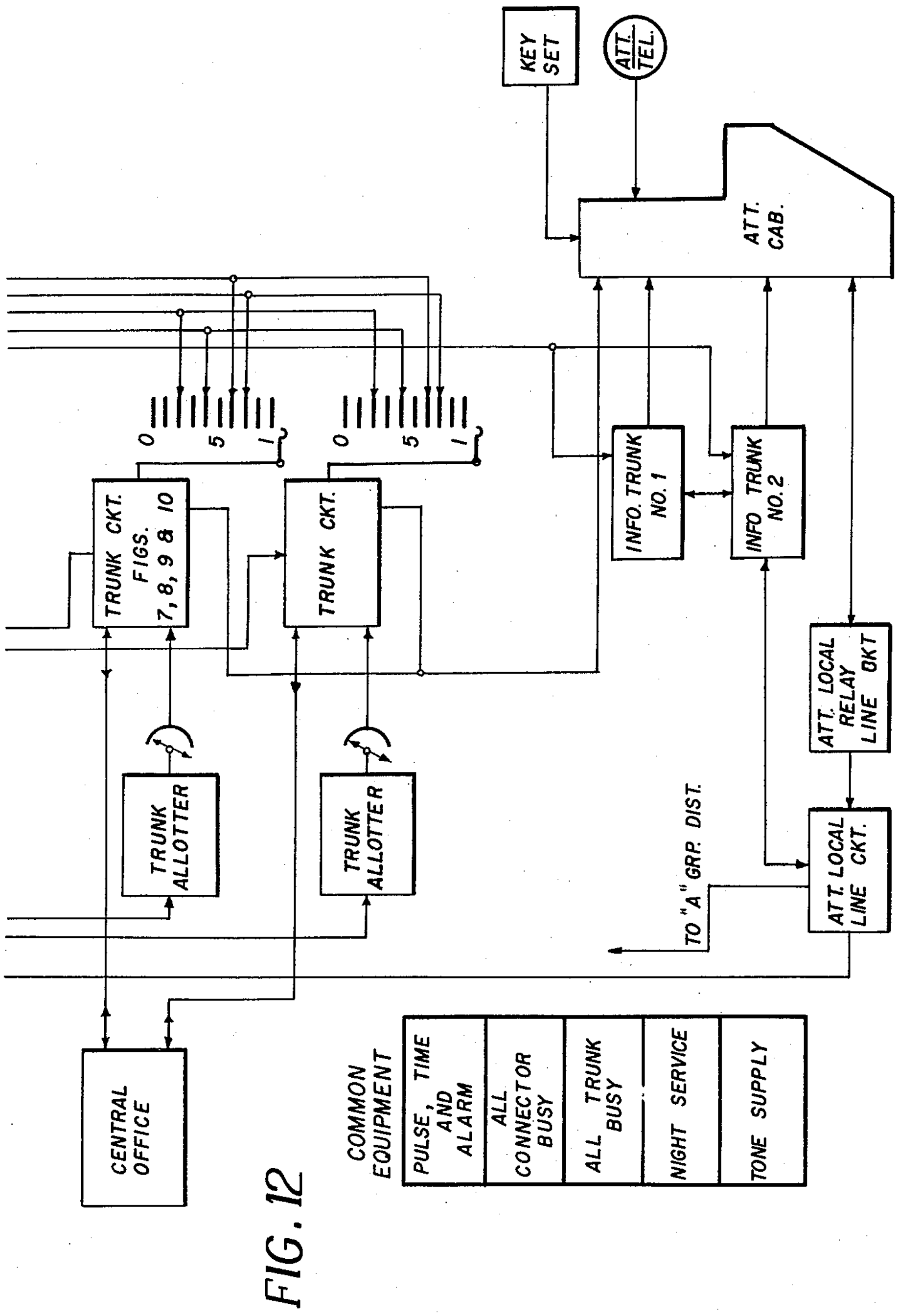

The trunking diagram comprising Figs. 11 and 12 represents one illustration of a preferred working embodiment of all the apparatus disclosed and described in detail later on in this specification.

*General description*

Referring to the trunking diagram comprising Figs. 11 and 12 and the drawings comprising Figs. 1 through 4, it will be noted that the finder-connector links are divided into group A links and group B links, with each group of links serving first and second groups of local subscriber lines. From the line circuit start and level marking arrangement shown in Fig. 1, it will be seen that the A group of finder-connector links gives first choice service to the first group of subscriber lines, while the B group of finder-connector links gives first choice service to the second group of subscriber lines. It will further be noted that each group of finder-connector links has a common distributor such as shown in detail in Fig. 2 associated therewith.

Reference will be had with Fig. 12 of the trunking diagram, wherein it will be seen that certain common equipment such as night service, tone supply, all-trunk-busy, all-connector-busy, and time pulse are each represented in block diagram. Since this common equipment is universal and well-known in the art, it is thought unnecessary to burden the present description with a detailed description thereof. It will be noted that still other equipment such as the trunk allotters, the information trunks leading to the attendant's cabinet, the attendant's cabinet, the attendant's keyset, the attendant's local line circuit, the attendant's local relay line circuit and the tie-line line circuit have all been represented in block diagram and since the operation of this equipment is also well-known in the art, detailed operational descriptions will not be given in this specification.

Referring to the local finder-connector link such as disclosed in Figs. 1, 3 and 4, it will be seen that this link is of the well-known Strowger step-by-step type, but modified to include the features which will be described in detail later on in this specification. The finder-connector distributor such as shown in Fig. 2 comprises a well-known rotary switch and the necessary relay equipment to select idle links in the manner such as will be described in detail later on in this specification.

Figure 5:
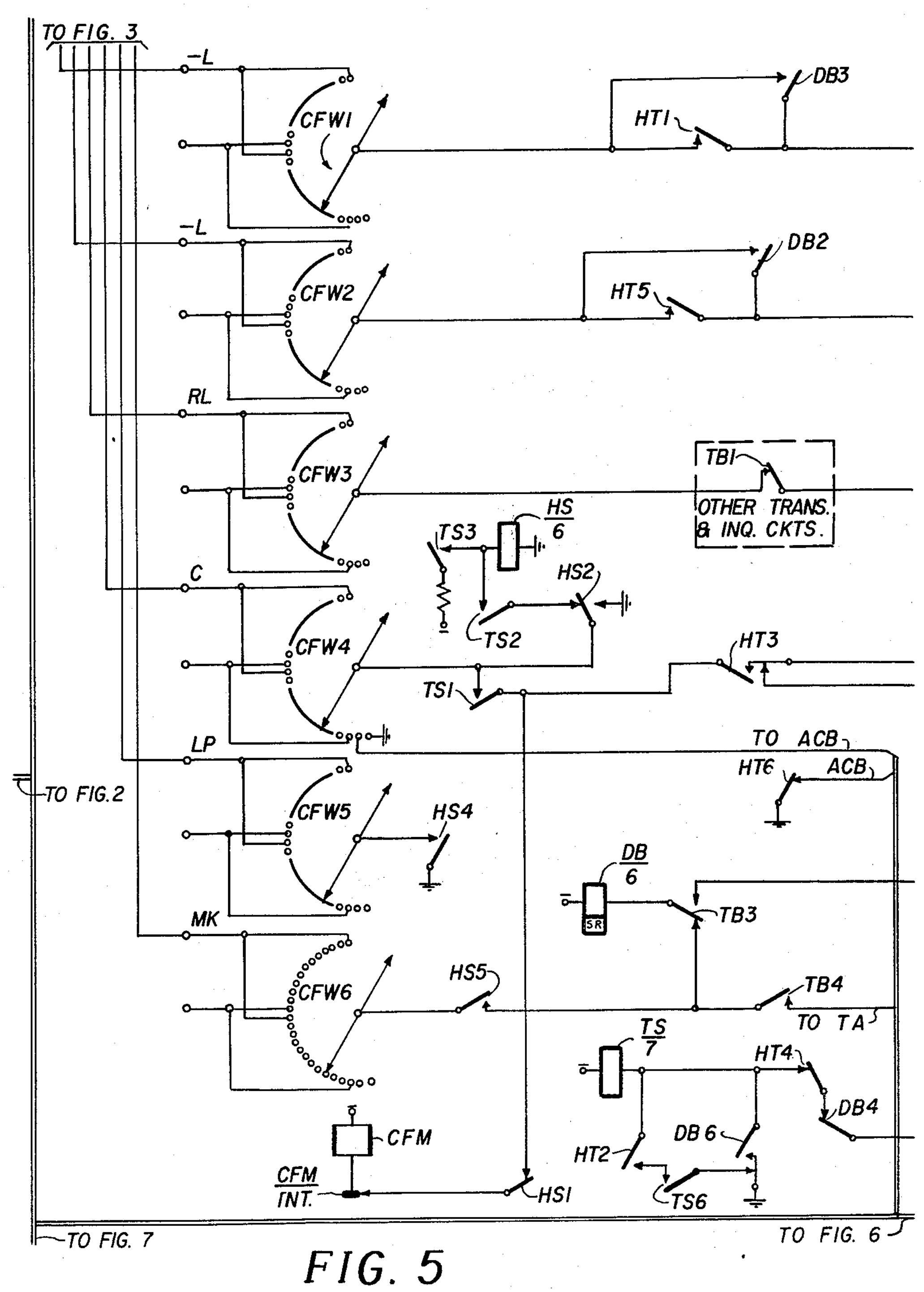
Figs. 5 and 6 show an inquiry and transfer circuit, with Fig. 5 showing the connector finder and wipers and Fig. 6 showing the trunk finder and wipers.
Figure 6:
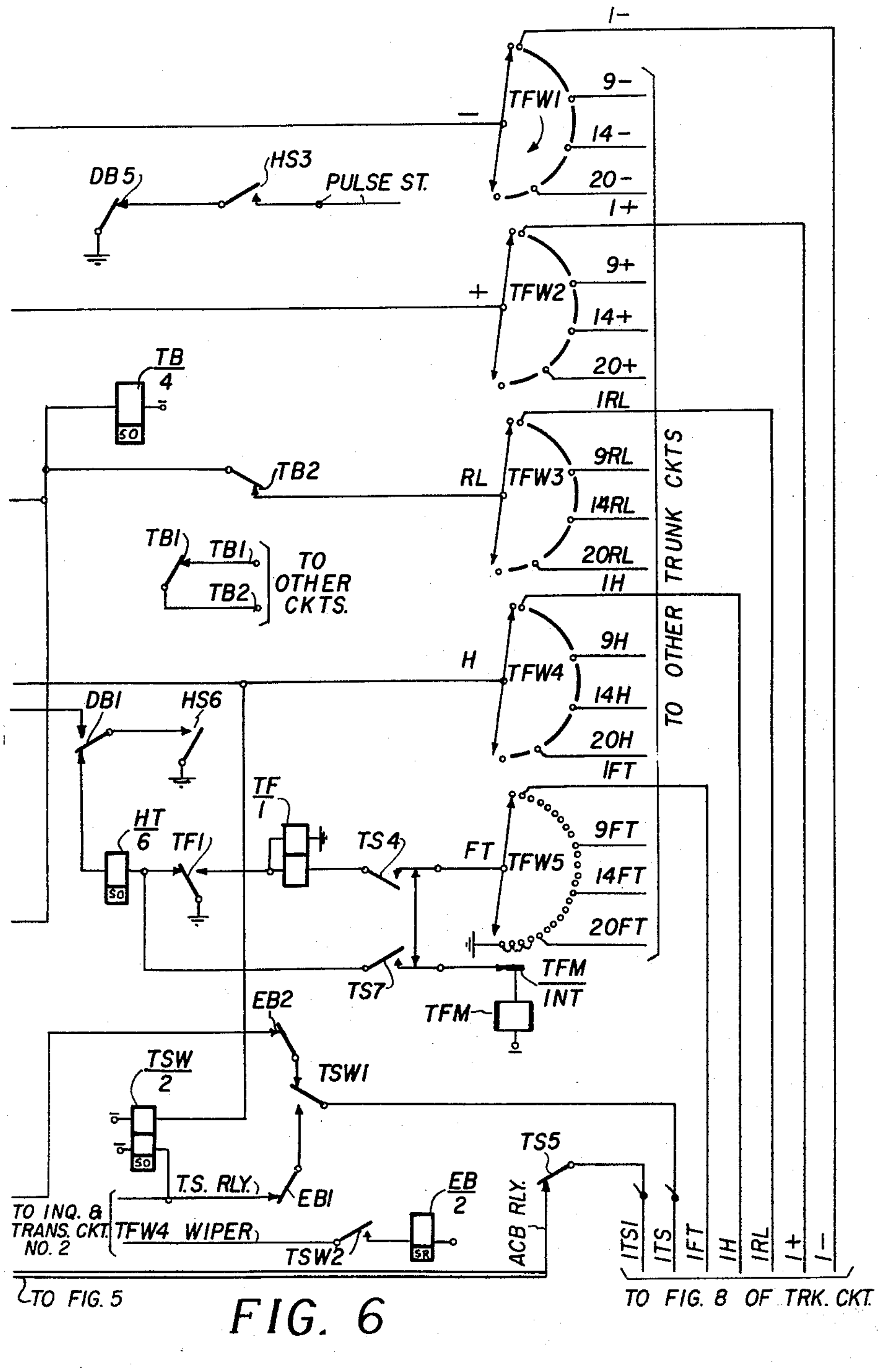

The inquiry and transfer circuit such as shown in Figs. 5 and 6 discloses a rotary connector-finder portion in Fig. 5 and a rotary trunk finder portion in Fig. 6, with the associated relay equipment necessary to operate both finders in the manner such as will also hereafter be described.

The trunk circuit such as shown in Figs. 7, 8, 9 and 10 is a two-way trunk circuit having wipers operated in a common and well-known step-by-step operation for connecting with local subscribers under certain later described conditions.

Cables are shown and have been utilized throughout in the drawings to reduce the number of lines extending therethrough and thus render the drawings more readable.

Figure 1:
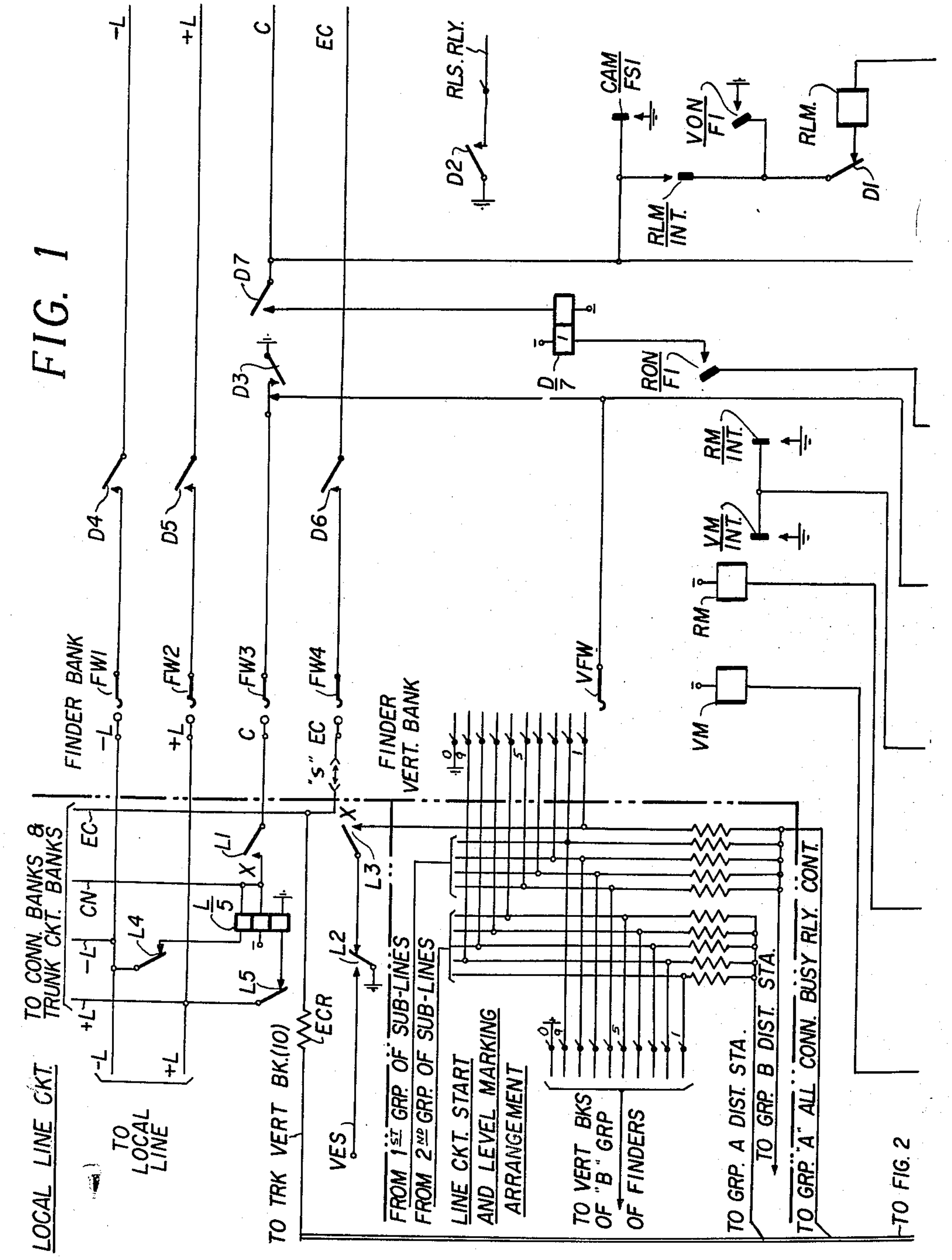
Figure 2:
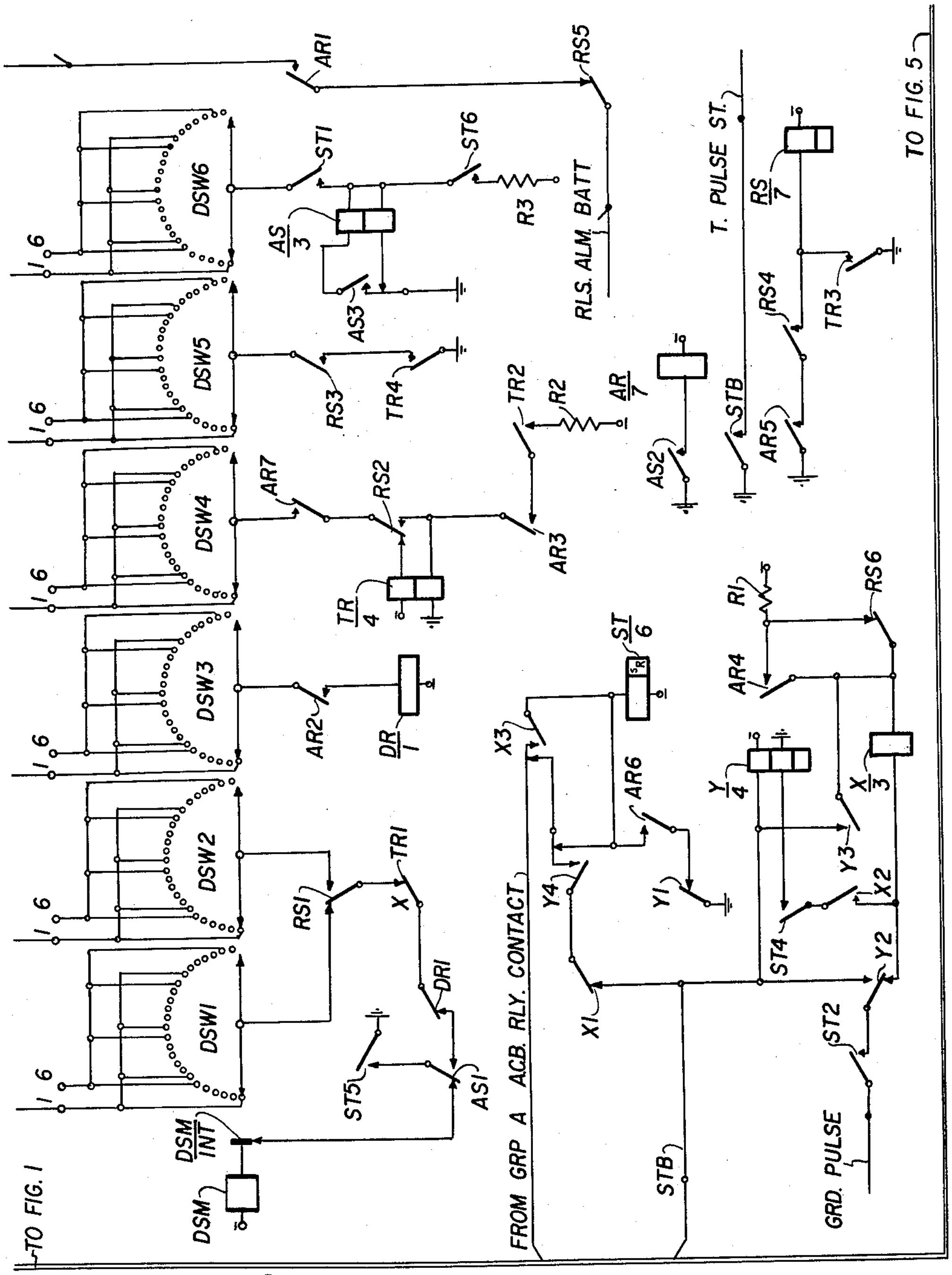
Fig. 2 shows the distributor for use in selecting idle finder-connector links in rotation.

Referring, for the time being, to Fig. 1, it will be noted that the local line circuit such as disclosed therein is assumed to be the line circuit of the local subscriber S32, and it will further be noted that subscriber S32 is a non-restricted subscriber. All non-restricted subscribers include the "S" wiring in the EC conductor leading from the finder bank to the local line circuit, while all restricted subscribers exclude this "S" wiring, whereby the EC conductors of these local line circuits are not connected to the finder banks.

Upon referring to Fig. 11 of the trunking diagram, it will be noted that subscribers S40 through S49 represent a local line group, with a P.A.B.X being so arranged as to provide group hunting. Since group hunting is well-known in the art, a detailed operational description will not be given. It will also be noted that tie-line service to a distant office is also provided, and since this service is also well-known in the art it will not be described in detail.

It is further assumed that the trunk allotters (not shown) serving the trunk circuits such as shown in Figs. 7, 8, 9 and 10 are of any well-known type and suitable for use in the present system.

A general outline of the disclosed P.A.B.X reveals that this P.A.B.X is arranged to serve from 50 to 90 lines, with approximately six finder-connector links being associated with each of the two groups of finder-connector links. A group of approximately ten trunk circuits, with a common allotter is associated with each group of finder-connector links. While only one inquiry and transfer circuit is shown, it is assumed that two of these circuits may be used in this system.

In operation, it will be noted that local P.A.B.X calls are made in the later-described manner over the local finder-connector links such as shown in Figs. 1, 2, 3 and 4.

On an incoming trunk call, the trunk circuit such as shown in Figs. 7, 8, 9 and 10 is seized and the operator at the attendant's cabinet is signalled. The operator at the attendant's cabinet thereupon dials the number of the desired local P.A.B.X line over the seized trunk circuit to complete the connection of the call.

Outgoing trunk calls may be made by any of the non-restricted local P.A.B.X subscribers dialling a predetermined digit "9" over the local finder-connector link, which then starts the trunk allotter to select an idle trunk circuit and cause the trunk circuit to hunt for and connect with the calling local P.A.B.X subscriber line, after which the local finder-connector link is released and the non-restricted subscriber can thereafter dial the call number of the desired party. The operator at the attendant's cabinet may make an outgoing trunk call over the trunk circuit and later extend a connection from the called party to a local P.A.B.X subscriber line.

If an engaged local subscriber, during either an outgoing or an incoming trunk call, desires to call the operator at the attendant's cabinet, the single digit "1" is dialled to cause the necessary operations.

For night service on incoming calls, a local P.A.B.X finder-connector link is dialled to the "0" level by a local subscriber to cause the trunk circuit over which the night call is received to hunt for and connect with the answering local P.A.B.X line, after which the local finder-connector link is released.

On information calls by a local P.A.B.X subscriber, the single digit "0" is dialled to cause the local connector to hunt for and connect with an idle information trunk leading to the operator at the attendant's cabinet, whereby the attendant is signalled.

Inquiry, or transfer calls, can be made by a first local

P.A.B.X subscriber that is engaged on a trunk call in response to the first local subscriber dialling the single digit "2". The dialling of the digit "2" places the trunk in a hold position and causes an idle inquiry or transfer circuit to connect with the trunk and also seize an idle local connector. The connector is thereafter operated in response to dialling by the first local P.A.B.X subscriber for extending a call to a desired second local P.A.B.X subscriber. The calling first local P.A.B.X subscriber may return to the held trunk responsive to the called second local P.A.B.X subscriber hanging up, while if the call is to be transferred to the called second local P.A.B.X subscriber, the calling first local P.A.B.X subscriber hangs up and the called second local P.A.B.X subscriber thereafter dials the digit "2" to accept the transfer. The back-bridge relay in the local connector operates responsive to the dialling of the digit "2" by the called second local P.A.B.X subscriber to cause the trunk circuit to restore to normal, after which the same trunk circuit is reoperated to connect with the second local P.A.B.X subscriber, with the local connector being released and the second local P.A.B.X subscriber being included in the previously established trunk call.

It will be appreciated, that while the drawings of applicant's disclosure are of the detached contact type, each particular relay is given a particular letter designation, with a numeral appearing beneath the relay letter designation to indicate the number of contacts controlled by that particular relay.

In the following detailed operational descriptions, it will also be appreciated that when a contact unit associated with a particular relay, or mechanical spring set, is not referred to at the time of the operation or release of the relay or spring set, this particular contact has no useful purpose or function during that stage of the operational description.

Detailed operational descriptions will now follow.

*Call from local subscriber to local subscriber*

Before starting the operational description of the above-mentioned type of call, reference will first be had with the trunking diagram comprising Figs. 11 and 12. In order to describe the above-mentioned call, it will be assumed that the local P.A.B.X subscriber station such as S32 in the first group of subscriber lines desires to call the local P.A.B.X subscriber station such as S62 in the second group of subscriber lines. Therefore, from the trunking diagram, it will be noted that special reference will hereafter be had with Figs. 1, 2, 3, and 4 of the drawings. In order to more easily follow this description, Figs. 1, 3 and 4 should be arranged from left to right respectively, with Fig. 2 being placed directly below Fig. 1.

It will be pointed out that the lines of the local P.A.B.X subscriber stations S32 and S62 are equipped with local line circuits of the type such as shown in the upper left hand corner of Fig. 1.

The loop circuit over the line of the calling subscriber S32 is completed in a well-known manner responsive to the removal of the handset by the calling subscriber for completing the first step operating circuit of line relay L. This first step operating circuit may be traced as extending from ground through the lower winding of line relay L, contacts L5, the +L line conductor, the closed loop of the subscriber S32, the −L line conductor, contacts L4, the upper winding of relay L and through the middle winding of relay L to battery.

In its first step operation, line relay L operates only its "X" contacts L1 and L3. At "X" contacts L1, battery is extended by way of the middle winding of relay L to mark a specific contact in the C, or control, contact bank accessible by the finder C wiper FWC. Upon the closing of "X" contacts L3, ground is extended from grounded contact L2 to mark a particular level in the vertical banks of the finders. This marked vertical bank level corresponds to the level in the finder contact banks in which the conductor of the calling subscriber S32 are found. Since it is assumed that at least one of the finder connector links in the A group is idle, the closing of the "X" contacts L3 also completes the start circuit by operating the start relay ST in the A group finder connector distributor. This circuit may be traced as extending from ground at contact L2, operated "X" contact L3, closed contacts of the normally operated all-connectors-busy relay (not shown), the break contacts of X3, the break contacts of Y4 and through the winding of relay ST to battery.

For the time being it will be assumed that the wipers of the distributor switch are engaged with a contact (as shown) corresponding to a finder-connector link that is idle. Therefore, wiper DSW6 does not encounter a busying ground potential from the engaged link. This absence of ground is effective to allow the immediate operation of the start relay ST which in turn causes the subsequent operation of relay AS and will hereafter be described.

In actuating its contacts, start relay ST closes its "X" contacts ST1 first to provide a circuit from the link engaged by the distributor for determining the busy or idle condition of the link, prepares a point in the ground pulse circuit at contacts ST2 from the time delay pulse equipment to relay X, applies ground to the pulse start lead at contacts ST3 for starting the time delay pulsing equipment, prepares a point in the circuit to relay Y at contacts ST4, completes an obvious circuit to the distributor magnet DSM at contacts ST5 and completes an operating circuit for relay AS at contacts ST6. Since it has previously been mentioned that wiper DSW6 did not encounter a busying ground, the circuit completed at contacts ST6 is effective for operating relay AS and may be traced as extending from ground, the break contacts of AS3, lower winding of relay AS, contacts SD6 and resistance R3 to battery.

Relay AS is an extremely fast-operating relay and therefore operates to seize the idle link before the distributor magnet DSM has had time to fully energize. In actuating its contacts, relay AS opens the above-mentioned circuit of the distributor magnet DSM at the break contacts of AS1 before magnet DSM has operated, completes an obvious circuit at contacts AS2 for operating relay AR and changes the holding circuit of relay AS from its lower winding to its upper winding by means of the make-before-break contacts of AS3. The make contacts of AS1 also completes the operating circuit of the vertical magnet VM of the idle line finder encountered by the distributor over a circuit which may be traced from ground at contacts ST5, contacts AS1, DR1, TR1, break contacts of RS1, wiper DSW1 and engaged bank contact and through the winding of the vertical magnet VM to battery. Since the upper winding of relay AS is of a low resistance, it will be noted that ground is extended by way of the make-before-break contact of AS3, the upper winding of relay AS, "X" contacts ST1, wiper DSW6 and the engaged bank contact to the C conductor to the seized link to guard the link against possible seizure by another distributor.

If it is assumed for the moment that the wipers of the distributor switch are engaged with a contact corresponding to a finder-connector link that is busy, the wiper DSW6 will encounter a busy ground potential which is extended to the distributor by way of the C conductor of the busy link. Therefore, when the start relay ST closes its "X" contacts ST1, the above-mentioned ground is extended to shunt the lower winding of relay AS to render contacts ST6 ineffective for operating this relay until the distributor wipers are advanced into engagement with an idle link as will hereafter be described. Since relay AS has not operated, the above-mentioned circuit for operating the distributor magnet DSM is completed at contacts ST5. Magnet DSM energizes, advances its wipers DSW1 through DSW6 one step to the next successive contact and interrupts its own operating circuit at its interrupter contacts DSM/INT. During the time that the distributor wipers are engaged with the new contacts and while the magnet DSM is restoring, a test is made to determine the busy or idle condition of the link connected to these new contacts. If wiper DSW6 encounters a ground potential, which indicates that the link is busy, nothing happens until the distributor magnet DSM restores its interrupter contacts DSM/INT to again complete its own operating circuit. The distributor magnet DSM repeats the above-described cycle to advance the wipers to the next contact and again interrupt its own circuit. If wiper DSW6 again encounters ground, magnet DSM will repeat the cycle to advance its wipers another step. If at this time wiper DSW6 does not encounter ground, relay AS operates as previously described and opens the circuit of magnet DSM at contacts AS1 to prevent further rotation of the distributor wipers.

Returning to the present description, wherein the operation of relay AR disconnects the release alarm battery from the finder release magnet RLM at contacts AR1, prepares a point in the circuit to relay DR at contacts AR2, prepares a point in the circuit to the lower winding of relay TR at contacts AR3, completes an alternate path in the previously described circuit to relay X at contacts AR4, prepares a point in the circuit to relay RS at contacts AR5, completes a holding circuit for the start relay ST at contacts AR6, and prepares a point in the circuit to the upper winding of relay TR at contacts AR7.

When the finder vertical magnet VM energizes responsive to the completion of its operating circuit, as described above, its interrupter springs VM/INT close and a circuit is completed for operating the stepping relay DR. This circuit may be traced as extending from ground at interrupter springs VM/INT, the bank contact engaged by wiper DSW3, contacts AR2 and through the winding of relay DR to battery.

In actuating its contacts, relay DR opens the previously described circuit to the vertical magnet VM at contacts DR1. Vertical magnet VM thereupon restores and at its interrupter contacts VM/INT opens the previously described operating circuit of relay DR. Upon restoring, relay DR again completes the operating circuit of the vertical magnet VM at its contacts DR1. It will be remembered that each time the vertical magnet VM energizes, it raises the finder wipers FW1 through FW4 one step. The vertical wiper VFW is also stepped at the same time that the above-mentioned finder wipers are stepped. This interaction between the vertical magnet VM and the distribuotr relay DR continues until the level in the vertical bank is found which has the marking ground from contacts L2 of the operated line relay L of the local line circuit of calling subscriber S3. At the time that the vertical wiper VFW encounters this above-mentioned ground potential a circuit is completed for operating relay TR. This circuit may be traced as extending from ground at contacts L2, contacts L3, vertical wiper VFW, bank contact engaged by wiper DSW4, contacts AR7, break contacts of RS2 and through the upper winding of relay TR to battery. Since relay DR has operated responsive to vertical magnet VM closing its interrupter contacts VM/INT, relay DR has opened the circuit to vertical magnet VM at its contacts DR1 and the above-mentioned operation of relay TR will open a further point in the circuit to vertical magnet VM at its "X" contacts TR1. Vertical magnet VM therefore will not reoperate and it will open the circuit to relay DR at its interrupter contacts VM/INT so that relay DR will restore, with no effect on the circuit for the time being. In actuating the remainder of its contacts, relay TR completes an obvious holding circuit for itself over its lower winding at contacts TR2, completes an obvious circuit for relay RS at contacts TR3 and at contacts TR4 prepares a point in the future energizing circuit of relay D in the finder.

In actuating its contacts, relay RS completes an obvious locking circuit at "X" contacts RS4 for itself, opens the previously-traced operating circuit of vertical magnet VM at the break contacts of RS1, prepares a point in the operating circuit to the rotary magnet RM at the make contacts of RS1, opens the initial operating circuit of relay TR at the break contacts of RS2, connects the ground encountered by the vertical wiper VFW to shunt the lower winding of relay TR at the make contacts of RS2, so that this relay releases, performs no useful function for the present at contacts RS3, opens a further point at contacts RS5 to remove the release alarm battery from the release magnet RLM and at contacts RS6 opens an alternate point in the circuit to relay X.

Upon the release of relay TR at contacts TR1, a circuit is completed for operating rotary magnet RM. This circuit may be traced as extending from ground at contacts ST5, make contacts AS1, contacts DR1, TR1, make contacts of RS1, wiper DSW2 and engaged contact and through the winding of magnet RM to battery. Rotary magnet RM now operates to advance the finder wipers FW1 through FW4 one step across the selected vertical level and upon energizing at its interrupter contacts RM/INT completes an obvious circuit for the relay DR. Relay DR operates its contacts DR1 to open the energizing circuit of rotary magnet RM so that this magnet will now restore and open the energizing circuit of relay DR. This interaction between rotary magnet RM and relay DR continues in the same manner as previously described during the operation of vertical magnet VM and relay DR.

Since it has previously been mentioned that subscriber S32 is the calling local station, it will be assumed that the line conductors from the local line circuit of the calling subscriber S32 are connected to the second contact of the third level in the finder bank. Therefore when the rotary magnet RM has operated to advance the finder wipers FW1 to FW4 into engagement with the second contact on the third level of the finder bank, the marking potential which was previously described as extending from the middle winding of the line relay L is encountered by the finder control wiper FW3 to complete a series circuit for operating relay TR and the line relay L in its second step operation. This circuit may be traced as extending from ground through the lower winding of relay TR, the make contacts of RS2, contacts AR7, wiper DSW4 and engaged bank contact, break contact of D3, wiper FW3 and engaged bank contact, "X" contacts L1 and through the winding of line relay L to battery.

In its second step operation, line relay L disconnects the start and marking ground potential at contacts L2 and opens contacts L4 and L5 to remove its upper and lower windings respectively, from the calling line. In the reoperation of its contacts, relay TR opens the previously described operating circuit of rotary magnet RM at "X" contacts TR1, completes the previously described holding circuit for itself at contacts TR2 and at contacts TR4 completes an operating circuit for relay D in the finder. This circuit for operating relay D may be traced as extending from ground at contacts TR4, contacts RS3, wiper DSW5 and engaged bank contact, rotary off-normal contacts RON/F1 and through the left-hand winding of relay D to battery. It will be appreciated that at the time that rotary magnet RM first operated to advance the finder wipers in the first rotary step, the rotary off-normal springs RON/F1 closed to prepare a circuit for the relay D, which was completed as described above at the time that contacts TR4 were closed. Line relay L of the local line circuit may tend to restore due to the closing of contacts TR2, since the middle winding of this relay may be shunted temporarily due to the application of battery to the other side of this winding at the time that contacts DR2 close, however, since relay D will operate extremely fast, line relay L will not restore as will hereafter be described.

In actuating its contacts, relay D completes the above-mentioned holding circuit for line relay L at the make contacts of D3, the opening of break contacts at D3 has no effect at the present, contacts D1 opens a point in the circuit to the release magnet RLM, contacts D2 completes the circuit for operating a common release relay (not shown), contacts D4, D5, and D6 extend the —L, +L and EC conductors into the connector and the closing of contacts D7 prepares a point in the holding circuit for the relay D.

Before continuing with the operational description of the present initiated call, it is thought advisable to completely describe the operations of the distributor. At the time that line relay L of calling local line circuit operated in its second step, the circuit to the start relay ST in the distributor was opened due to the operation of contacts L2, at which time the ground was removed from this start circuit. If there were no further calls awaiting disposition by the distributor, no start and marking grounds would be applied to the start conductor leading to the start relay ST. Relay ST would therefore release and open the circuit to relay AS at contacts ST6. Relay AS would therefore release and be followed in turn by the release of relays AR, TR and RS. The distributor would now be completely restored to normal.

However, if another call is awaiting disposition at the time that the previously described line relay L operated in its second step operation, relay ST would be held operated to the start and marking ground applied to the grounded start conductor of this other calling line. Therefore when ground is returned over the C conductor from the connector of the previously-described seized link, this ground would short-circuit the holding winding of relay AS to cause it to release. The release of relay AS would subsequently cause the release of relays AR, TR and RS, as mentioned above. In this case the wipers DSW1 through DSW6 of the distributor would be engaged with contacts representing the above-mentioned busy finder-connector link and since relay AS is no longer operated, a circuit would be completed as previously described from the contacts ST5 of the operated start relay to complete a circuit to the distributor magnet DSM, also as previously described. The distributor hereafter operates as described before to find and connect with an idle finder-connector link.

A time-delay feature is provided, whereby under certain fault conditions, this time-delay will become effective to release the distributor serving the finder-connector links in the A group and transfer the start condition to a distributor serving finder-connector links assigned to the B group.

The start of this time-delay equipment is initiated by the operation of the start relay in the distributor, which at contacts ST3 as previously described, applies ground to the pulse-start lead to start the operation of the time-delay equipment. At the expiration of a predetermined time interval, a ground pulse is applied to the distributor from the timing equipment and by way of the ground pulse lead, contacts ST2, break contacts at Y2, the winding of relay X, contacts AR4 if they are operated, or contacts RS6 and through the resistance R1 to battery, whereby relay X operates over this circuit.

In actuating its contacts, relay X opens a point in the circuit from the disclosed A group distributor to the B group distributor by way of conductor STB at contacts X1, prepares a point in the operating circuit of relay Y at contacts X2 and at the make contacts of X3 maintains the start ground to relay ST from the grounded L2 contacts of the line relay of the local line circuit individual to the subscriber S32. When the pulse of ground supplied by the time pulsing equipment is removed from the ground pulse conductor, a circuit is completed for operating relay Y. This circuit may be traced as extending from ground through the lower winding of relay Y, contacts ST4, contacts X2, the winding of relay X, contacts AR4 or RS6 and through the winding of resistance R1 to battery.

In actuating its contacts, relay Y opens the previously-mentioned holding circuit of start relay ST at contacts Y1, changes over the ground pulse conductor at the make contacts of Y2 to the upper winding of relay Y, prepares a circuit for shunting relay X at contacts Y3 and at contacts Y4 prepares a holding circuit for relay Y over its upper winding.

If due to some fault, the A group distributor fails to find an idle finder-connector link within the lapse of a predetermined period of time, the next ground pulse received over the ground pulse conductor is extended by way of contacts ST2, the make contacts at Y2, and through the upper winding of relay Y to battery for holding relay Y operated. This same ground pulse is also applied over the above-traced circuit down through contacts Y3 and is applied to the right-hand side of the winding of relay X, for shunting relay X since ground is applied by way of the lower winding of relay Y to the left-hand side of the winding of relay X. Upon restoring, the holding circuit is completed for relay Y at the break contacts of X3 and at contacts X1. This holding circuit may be traced as extending from the start conductor that is grounded by the new calling line, break contacts at X3, the make contacts at Y4, contacts X1 and through the upper winding of relay Y to battery. Since it has previously been mentioned that relay AR has restored, the formerly mentioned holding circuit of relay ST is opened at contacts AR6. However, at that time, relay ST is still held operated by way of the make contacts at X3. Therefore, the restoring of contacts X3, due to the release of relay X, has opened the circuit to the start relay ST whereby relay ST restores. The restoring of contacts X1 and X3 also extends the above-mentioned ground out over the STB conductor to the B group distributor to operate the relay Y in that group. All of the relays in A group distributor will either have restored or restore, with the exception of relay Y which will be held operated, as previously described. This grounded start conductor from the calling line is therefore extended through the A group distributor to the B group distributor by way of conductor STB, which at the B group distributor is connected (not shown) to the start conductor thereat for operating the start relay such as ST thereat. The B group distributor thereupon is operated in the same manner as described for the A group distributor for hunting for an idle finder-connector link for the calling A group line.

In describing the following fault condition, it will be assumed that the marked vertical level in the finder cannot be found by the vertical wiper such as VFW. Under these circumstances, the vertical bank wiper VFW will be stepped to the tenth or 0 level, where it will be noted that ground is permanently connected thereto. At this time a circuit such as previously traced is completed for operating relay TR, which in turn completes a previously-described circuit for operating relay RS, whereby the distributor is operated to rotate the finder wipers over the tenth level in a manner such as previously described to the eleventh bank contact in the tenth level. At this time, cam springs CAM/FS1 close to complete a similarly described circuit for shunting the lower winding of relay AS, which thereupon releases. Relay AS causes the release of relay AR, which in turn causes the release of relay RS. The release of relay AS also completes a previously described circuit for operating the distributor magnet DSM to cause it to step the distributor wipers DSW1 through DSW6 one step. The release of relay RS at contacts RS5 completes a circuit from the release alarm battery through the finder-release magnet RLM to ground through operated vertical off-normal contacts VOM/F1. The release magnet RLM of this finder thereupon causes the finder to restore its wipers to normal in a well-known manner. The distributor now will hunt for and connect with the next idle finder-connector link.

Upon returning to the present operational description, it will be remembered that relay D of the finder had just operated to extend the —L, +L and EC conductors into the associated connector, whereby a circuit is completed for operating the connector line relay A. The circuit for operating the connector line relay A may be traced as extending from ground through the lower winding of relay A, from the +L line conductor of the connector into the finder, contacts D5, finder wiper FW2 and engaged bank contact, +L line conductor leading to the local line circuit of subscriber S32, through the closed loop at subscriber S32, back over the —L line conductor of the local line circuit, the bank contact engaged by finder wiper FW1, contacts D4, the —L line conductor into the connector and through the upper winding of line relay A to battery.

In actuating its contacts, line relay A completes obvious circuits for operating relays B and C at the make contacts of A1. The closing of contacts A2 provides no useful function during the present type of call.

In actuating its contacts, relay B prepares a point in the pulsing circuit to the vertical magnet 1VM at the make contacts of B1, removes ground from the all-connector-busy relay ACB (not shown) and applies it to the C conductor of the seized finder-connector link to hold the preceding equipment and to guard the link against seizure, extends ground at contacts B3 to operate the common release relay (not shown), prepares a point at contacts B4 in the circuit to the digit absorbing relay CL and at contacts B5 extends ground from the break contacts of CD6, TL4, and contacts B5 to the motor start circuit.

In actuating its contacts, relay C performs no useful function for the present at its contacts C1, completes the preparation of the pulsing circuit to the vertical magnet 1VM at the make contacts of C2, completes a circuit for operating relay J at the make contacts of C3, and performs no useful function for the present at contacts C4. The circuit for operating relay J may be traced as extending from ground at the make contacts of B2, the break contacts of H1, the make contacts of C3, and through the lower winding of relay J to battery.

In actuating its contacts, relay J performs no useful function for the present at contacts J1, J2, J3, J4, and J6, while the closing of contacts J5 completes an obvious circuit for transmitting dial tone to the calling subscriber S32.

It will be remembered that the wiring arrangement of the connector, as disclosed herein and previously described in detail, is such that three-digit working of the connector is necessary to complete a call of this type. This three-digit working represents a first digit common to all of the local call numbers and will, for the purpose of the present description, be assumed to be the digit "2." Further, since the called party is the subscriber S62, the call number to be dialled by the calling subscriber S32 is assumed to be the three digit number "262."

Responsive to receipt of dial tone, the calling subscriber S32 now proceeds to dial the digits of the above-mentioned call number.

Line relay A of the connector responds to receipt of impulses of the first dialled digit "2" and restores and reoperates a total of two times each. Upon each release of relay A, the break contacts of A1 (which represent the pulsing contacts) are closed to complete a circuit for energizing the vertical magnet 1VM. This circuit for operating vertical magnet 1VM may be traced as extending from ground through the break contacts of A1, the make contacts of B1, the make contacts of C2, contacts CD1 and through the winding of vertical magnet 1VM to battery. It will be noted that the pulses over this same circuit are also effective for holding relay C operated by way of its upper winding, since its original energizing circuit has been opened at vertical off-normal contacts VON/C3, for the reason that these vertical off-normal contacts open in response to the first vertical step of the connector-wipers.

At the end of the first train of impulses, line relay A will remain operated and therefore open the previously described pulsing circuits to the vertical magnet 1VM and relay C at the make contacts of A1. Also, at the end of the receipt of impulses of the first dialled digit, it will be noted that the connector wipers CW1 through CW4 are raised to the second bank contact level. Although relay C is constructed as being slow-to-release, its characteristics are such that it will completely restore at the end of this first digital train of impulses. This release of relay C opens the previously traced circuit by opening the make contacts of C3 to allow relay J to restore. The restoring of relay J has no effect on the circuits for the present.

Responsive to the connector wipers being raised to the second level all of the left normal post springs (LNP) operate. However, the operations of the left normal post springs LNP1 and LNP2 have no effect on the circuits of the connector for the present. The operation of left normal post springs LNP3 completes a circuit for operating digit absorbing relay CL. This circuit may be traced as extending from ground at the make contacts of B2, break contacts of H1, the break contacts of C3, down through the closed left normal post springs LNP3, the break contact of right normal post springs RNP1, and through the winding of relay CL to battery. Relay CL is constructed as being slow-to-operate, so that during its operate time, this same above-mentioned ground is not only extended over the previously traced circuit to relay CL, but also by way of the unoperated contacts CL2, contacts B4, vertical off-normal contacts VON/C2 and through the winding of the release magnet 1RLM to the release battery (not shown). Therefore, during the time that relay CL is energizing, the release magnet 1RLM operates to restore the connector wipers to normal in a well-known manner.

In actuating its contacts, relay CL completes its own holding circuit from the grounded make contacts at B2 by way of its "X" contacts CL1, opens the circuit to the release magnet 1RLM at contacts CL2, opens contacts CL3 to prevent trunk hunting during this type of call, opens other connections to the trunk circuits at contacts CL4, CL6 and CL7 and at contacts CL5 prevents the application of dial tone to the calling line when the vertical off-normal springs VON/C1 close, responsive to the connector wipers being restored to normal. Also, at the time that the vertical off-normal springs VON/C3 close (when the connector-wipers are restored) the previously traced circuit is again completed for reoperating relay C so that the previously traced pulsing circuit to the vertical magnet 1VM is again prepared at the make contacts of C2. In closing the make contacts of C3, relay C again completes the previously described circuit to reoperate relay J. The reoperation of relay J has no effect on the circuits for the present.

Responsive to the second digit "6" of the call number being dialled, the line relay A of the connector restores and reoperates a total of six times each, whereby the pulsing circuit to the vertical magnet 1VM is completed a like number of times to cause the vertical magnet 1VM to raise the connector wipers CW1 through CW4, in the same manner as previously described, to the sixth bank contact level. At the end of this second train of impulses, relay C is again released as previously described. The restoring of relay C opens the previously described energizing circuit to relay J at the make contacts of C3 and at the break contacts of C2 prepares a point in the rotary pulsing circuit to the rotary magnet 1RM. The restoring of relay J prepares a further point in the rotary pulsing circuit to the rotary magnet 1RM at contacts J1. The equipment is now in condition to receive the rotary impulses corresponding to the last dialled digit "2" of the call number.

Responsive to the last digit "2" being dialled, the line relay A of the connector restores and reoperates a total of two times each, whereby the rotary pulsing circuit to the rotary magnet 1RM is completed a like number of times to cause the rotary magnet 1RM to rotate the connector wipers CW1 through CW4 across the selected bank contacts of the sixth level. It will be noted at this time that since the vertical off-normal springs VON/C3 are open, relay C is not operated during the rotary pulsing. However, since relay B is slow-to-release it is held operated during the rotary pulsing over an obvious circuit. The circuit for pulsing rotary magnet 1RM may be traced as extending from ground through the break contacts of A1, the make contacts of B1, the break contacts of C2, contacts J1, CL8, the break-after-make contacts of F5, the winding of relay G, contacts H4 and through the winding of rotary magnet 1RM to battery.

Responsive to the first rotary pulse, relay G will operate over the above-traced circuit in series with the rotary magnet 1RM. Since relay G is constructed as being slow-to-release, its characteristics are such that it will operate responsive to this first rotary pulse and hold operated during the remainder of the rotary pulsing, at which time it will then release slowly to allow busy relay F of the connector to test for an idle or busy condition of the called line.

If it is assumed that the called subscriber S62 is busy, ground will be applied to the control bank contact individual to that line in a well-known manner. Responsive to this ground being encountered by the control wiper CW3, a circuit is completed for operating busy relay F. Before tracing this operating circuit for relay F it is thought advisable to mention the operations of relay G which at its make contacts G1 prepares a point in the operating circuit for relay F and at contacts G2 provides an alternate path to the rotary magnet 1RM and relay G. The operating circuit for relay F may be traced as extending from the grounded bank contact engaged by the control wiper CW3, the break-after-make contact at H2, the make contact at G1, the rotary magnet interrupter contacts 1RM/INT and through the winding of relay F to battery.

In actuating its contacts relay F performs no useful function for the time being at contacts F1, completes a holding circuit for itself at contacts F2 that is effective at the time that relay G restores its contacts at G1, performs no useful function for the time being at contacts F3, completes an obvious circuit at contacts F4 for applying busy tone to the calling line and at the break-after-make contacts of F5 opens the original rotary pulsing circuit. After a reasonable length of time, slow-to-release relay G restores, whereby the above-mentioned holding circuit for relay F is effective. This holding circuit may be traced as extending from ground at the make contacts of B2, the break contacts of H2, the make contacts of F2, the break-after-make contacts of G1, the rotary magnet interrupter contacts 1RM/INT and through the winding of relay F to battery.

Responsive to receipt of busy tone, the calling subscriber S32 may now restore the equipment to normal in a well-known manner by replacing his receiver to open the calling loop.

For the purpose of the present description it will be assumed that the called subscriber S62 is idle and the equipment will operate as hereafter described. Since the called subscriber S62 is idle, as stated above, no busying ground will be encountered by the control wiper CW3 and relay F will not operate. After a reasonable period of time, slow-to-release relay G restores and at the break-before-make contacts of G1 completes a circuit for operating relay H. This circuit for operating relay H may be traced as extending from ground at the make contacts of B2, the break-before-make contacts of H2, the break contacts of F2, through the left-hand winding of relay H, the break-before-make contacts of G1, the break-after-make contacts of H2, control wiper CW3 and engaged bank contact and through the middle winding of the line relay such as L in the local line circuit of subscriber S62 to battery. This line relay, such as L of the local line circuit, will operate in series with relay H of the connector and perform functions such as previously described for its second step operation.

In actuating its contacts, relay H closes its "X" contacts H3 to complete its own locking circuit, performs no useful function for the present at contacts M1, opens its original energizing circuit at the break-before-make contacts of H2, extends ground over the control wiper CW3 and engaged bank contact to hold the line relay such as L in the called station's line circuit operated and also guards the connection against seizure at the make contacts of H2, opens another point in its original energizing circuit at the break-after-make contacts of H2, opens the circuit to the rotary magnet 1RM at contacts H4, completes a circuit at contacts H5 and H6 for completing an obvious and well-known circuit to extend interrupted generator to ring the called station and at contacts H7 completes a circuit for returning ringback tone to the calling subscriber S32. This locking circuit for relay H may be traced as extending from ground at the make contacts of B2, "X" contacts H3, the right-hand winding of relay H and through resistance R5 to battery.

After a reasonable period of time the called subscriber S62 answers the call in a well-known manner by removing his receiver to complete the loop circuit at his station, whereby this completed loop circuit causes the ring cut-off relay CD to operate in a well-known manner. In actuating its contacts, ring cut-off relay CD opens the respective vertical pulsing and pulse holding circuits to the vertical magnet 1VM and relay C at contacts CD1, extends the loop of the called line to operate relay E at the make contacts of CD2 and the make contacts of CD3, closes its "X" contacts CD4 to complete an obvious holding circuit for itself from the grounded make contacts of B2, performs no useful function for the time being at the make contacts of CD5, opens a point in the circuit of the motor start conductor at the break contacts of CD6 and at the make contacts of CD6 completes a temporary circuit for energizing relay C. Back-bridge relay E thereupon operates over the closed loop of the called subscriber in a well-known manner. The circuit for operating relay E may be traced as extending from ground and the "X" wiring through the lower winding of relay E, the make contacts of CD2, contacts H5, the + line wiper CW2 and engaged bank contact, out over the closed loop of the called subscriber's station S62 and back to the bank contact engaged by the — line wiper CW1, contact H6, the make contact of CD3, the make contacts of A2, the "X" wiring and through the upper winding of relay E to the battery.

In actuating its contacts, relay E opens the temporary energizing circuit of relay C at contacts E1, performs no useful function at contacts E2, completes a circuit for operating relay J at contacts E3, performs no useful function at contacts E4 and E5, and completes a circuit for holding relay B operated at contacts E6. The circuit for operating relay J may be traced as extending from ground at the make contacts of B2, "X" contacts CD4, contacts E3 and through the upper winding of relay J to battery. The holding circuit for relay B may be traced as extending from ground at the make contacts of CD6, contacts E6, contacts F1, rectifier R*el*, and through the winding of relay B to battery.

The operation of relay J at this stage of the operational description has no effect on the present circuits of the connector and would only be effective in the event that two-digit call numbers were being used. The above-traced holding circuit for relay B provides the last-party release feature which will subsequently be explained later on in this description.

At the end of conversation, the calling and called parties replace their receivers in the usual manner to open their respective loop circuits. If the calling subscriber S32 should replace his receiver first, the previously described loop circuit is opened to relay A, which will thereupon restore. The restoring of relay A has no further effect upon the circuits for the present, since relay B is held operated over the above-described holding circuit, and Relay B in turn maintains the holding circuits to relay J and relay CD. Relay CD maintains the circuit to relay E so that now the connector circuits will remain in the present condition until the called subscriber S62 replaces his receiver to open his loop circuit, at which time the circuit to relay E is opened and relay E will then restore. The restoring of relay E opens the previously described circuits to relays J and B at its contacts E3 and E6 respectively. The restoring of relay B opens the holding circuits to relays CD and H at the break contacts of B2. The release of relay B at the break contacts of B1 also completes an obvious circuit to the release magnet 1RLM so that this release magnet now restores the connector wipers to normal as previously described. During the restoring of the connector wipers, relays CD and H release.

If the called subscriber S62 should replace his receiver first, the circuit to relay E would be opened and this relay would thereupon restore. The restoring of relay E would open the circuit to relay J at contacts E3 and open the above-mentioned holding circuit to relay B at contacts E6. However, only relay J will restore and, since relay B is held operated from the make contacts of A1, the connector will remain in this condition until the calling subscriber S32 subsequently replaces his receiver to open his loop circuit for restoring relay A. The restoring of relay A opens the circuit to relay B at the break contacts of A1 and this relay, upon restoring, opens the circuits to restore relays CD and H and also completes the circuit for operating the release magnet 1RLM, as previously described. The release magnet 1RLM thereupon restores the connector to normal in a well-known manner to provide handling of future calls.

*Outgoing trunk call from local subscriber to central office*

Before starting the operational description of the above-mentioned type of call, reference will first be had with the trunking diagram comprising Figs. 11 and 12. In order to describe the above-mentioned call, it will be assumed that the local P.A.B.X subscriber station such as S32 in the first group of subscriber lines desires to call a subscriber located in an exchange, not shown, but served by the central office. Therefore, from the trunking diagram it will be noted that in order to call the desired distant subscriber, an outgoing trunk call must be initiated by subscriber S32. It will be appreciated that specific reference will be had with Figs. 1, 2, 3, 4, 7, 8, 9, and 10 and that these drawings should be arranged as shown in the trunking diagram. It is pointed out that the trunk circuit comprises Figs. 7, 8, 9, and 10 and in order to properly follow the description herein it is necessary to arrange Figs. 7 and 8 from left to right and respectively place Figs. 9 and 10 directly below Figs. 7 and 8. As mentioned earlier in the description, only the non-restricted subscribers such as S32 can initiate and extend outgoing trunk calls, because of the "S" wiring in the local line circuit, individual to these non-restricted subscribers, which extends the extra control (EC) conductor in multiple to the contact bank accessible by the EC wiper of the trunk circuit and to the vertical marking bank accessible by the vertical wiper of the trunk circuit.

It is therefore assumed that subscriber S32 has acted to initiate an outgoing trunk call by removing his receiver to complete his line loop circuit in the same manner as previously described. It is further assumed that the finder distributor such as disclosed in Fig. 2 operates in response to the initiated call, also in the same manner as previously described, to select an idle finder-connector link such as disclosed in Figs. 1, 3 and 4, and to start the operation of the finder to cause it to hunt for and connect with the line of the calling subscriber S32.

At this stage of the operational description it will be noted that the same relays are operated and the circuits of the finder-connector link are in the same condition as described in the previous section entitled "Call from local subscriber to local subscriber" up to and including the point in the description where the calling subscriber has received dial tone and the connector is conditioned to receive impulses corresponding to the first dialled digit of the call number.

In the case of an outgoing trunk call from a non-restricted local subscriber, and for the purpose of the present description, the single digit "9" is assumed to be the trunk routing call number that must be dialled by the non-restricted local subscriber to initiate an outgoing trunk call.

Responsive to the receipt of dial tone, subscriber S32 dials the digit "9," thereby causing the line relay A of the connector to restore and reoperate a total of nine times each. Upon each restoration of line relay A, the pulsing circuit is completed for energizing the vertical magnet 1VM over a previously described path at the break contacts of A1. After the first pulse, vertical off-normal springs VON/C3 open, whereby the remaining pulses are effective for holding relay C operated during the received digital train of impulses, also as previously described. Since line relay A remains operated at the end of the first train of impulses, the above-mentioned pulsing and pulse-holding circuits are opened to the vertical magnet 1VM and relay C, respectively, at the make contacts of A1. As relay C is constructed as being slow-to-release, it will completely restore at the end of a predetermined period of time after this first digital train of impulses has ceased. It will be noted that the connector wipers CW1 through CW4 are raised to the ninth bank contact level at the end of the receipt of impulses corresponding to the dialled digit "9."

Responsive to the connector wipers being raised to the ninth level, all of the right normal post springs (RNP) operate. In operating, the right normal post springs RNP1 perform no useful function in the connector for the time being, the right normal post springs RNP2 complete respective circuits for marking both the vertical bank level and the bank contact outlet (corresponding to the calling line) in the vertical bank and the EC contact bank of the trunk circuits, the right normal post springs RNP3 extend ground over the allotter start lead to start the operation of the trunk circuit allotter (not shown) and the right normal post springs RNP4 prepares a point in the circuit for operating relay K of the connector. The circuit for marking the vertical bank of the disclosed trunk circuit may be traced as extending from ground at the make contacts of B2, contacts C1, through normally closed contacts of the transfer accept (TA) relay (not shown), contacts CL7, left normal post springs LNP1, right normal post springs RNP2, the EC conductor of the finder-connector link, contacts D6, the EC finder wiper FW4 and engaged bank contact, the "S" wiring and out over the resistance ECR and EC conductor to mark the vertical bank level in the trunk circuit corresponding to the level in the vertical finder bank that is marked at the time that subscriber S32 initiated the call. The circuit for marking the bank contact outlet in the EC contact bank of the disclosed trunk circuit may be traced as extending from ground at the make contacts of B2, contacts C1, through normally closed contacts of the transfer accept relay (not shown), contacts CL7, left normal post springs LNP1, right normal post springs RNP2, the EC conductor of the finder-connector link, contacts D6, the EC finder wiper FW4 and engaged bank contact, the "S" wiring, out over the EC conductor through the cable to the trunk circuit to mark the contact outlet in the EC contact bank corresponding to the calling subscriber S32.

Before continuing further with the present description, it is thought best to describe the operations of the trunk allotter circuit (not shown), which in the present disclosure will be assumed to be of any well-known and common type suitable for use with the present system. Therefore, for the sake of simplicity during the present description, it is assumed that the trunk allotter circuit used with the disclosed system is quite similar in arrangement and in operation as that of the finder-distributor shown in Fig. 2. Further, in reference to the allotter, it will be assumed that the conductors such as AL1 through AL6 leading from the disclosed trunk circuit are each connected to a specific bank contact in individual banks of the allotter, with each bank being accessible by individual allotter wipers. Additional conductors corresponding to the AL1 through AL6 conductors of other trunk circuits are connected to other contacts in the banks of the allotter in a manner similar to that shown in Fig. 2, wherein conductors of other finder-connector links are shown as connected to the banks of the distributor. A start relay is provided in the allotter to perform the well-known function of starting the operation of the allotter to select an idle trunk circuit.

As described earlier in this section, the above-mentioned allotter start relay is energized over a circuit completed in the connector as described at the time that the right normal post springs RNP3 closed. Referring to the connector shown in Figs. 3 and 4, this allotter start circuit may be traced as extending from ground at the make contacts of B2, the break contacts of H1, the break contacts of C3, right normal post springs RNP3, the break contacts of left normal post springs LNP2, contacts CL4, out over the allotter start conductor to the allotter and through the winding of the start relay to battery. The allotter starts its operation in a well-known manner responsive to the operation of the allotter start relay, to rotate its wipers to test and hunt for an idle trunk circuit.

If certain of the trunk circuits are busy, ground potential will be present on the AL1 conductors leading to the allotter. Therefore, the allotter actually hunts for an AL1 conductor having an absence-of-ground thereon. If it is assumed that the trunk circuit disclosed in Figs. 7 through 10 is idle, the allotter will encounter no ground on the AL1 conductor. The allotter therefore stops hunting responsive to this absence-of-ground and extends ground potential over various circuits (to be more completely described hereafter) for causing the trunk circuit to operate in a manner also as will hereafter be described.

The first of these grounds is extended over a circuit from the allotter by way of conductor AL4 and through the left-hand winding of relay CR for operating this relay, while the second of these grounds is extended over a circuit from the allotter by way of conductor AL3 to the B line conductor leading to the central office and the last of these grounds is extended over a circuit from the allotter by way of conductor AL5 for operating stepping relay DR. This circuit for operating relay DR may be traced from the ground on conductor AL5, the break contacts of the release magnet interrupter springs 2RLM/INT, contacts KT5, SW6, SR2, the rotary magnet interrupter springs 2RM/INT, the vertical magnet interrupter springs 2VM/INT and through the left-hand winding of relay DR to battery.

It will be noted that the grounding of the B line conductor leading to the central office, as mentioned above, serves both to guard the trunk circuit against subsequent seizure by the central office and seizes the central office equipment for future use during the present call.

In actuating its contacts, relay CR opens a point in the circuit to the release magnet 2RLM at contacts CR1, completes a circuit at the make contacts of CR2 for lighting the trunk supervisory lamp at the attendant's position over a path which will be described later on in this specification, prepares points in various circuits that are ineffective during the present type of call at contacts CR4 and CR5, disconnects relays AC and LR from the line conductors at contacts CR6 and CR7 and prepares a circuit to the release relay (not shown) at the make contacts of CR8.

In actuating its contacts, relay DR opens contacts DR1 to remove ground from the all-trunk-busy relay (not shown), prepares points in various ineffective circuits during the present type of call at contacts DR2 and DR3 and at contacts DR4 completes a circuit for energizing the vertical magnet 2VM. This circuit for energizing vertical magnet 2VM may be traced as extending from the grounded AL5 conductor from the allotter, the break contacts of the release magnet interrupter springs 2RLM/INT, contacts KT5, SW6, SR2, the break contacts of CE7, contacts DR4, the break contacts of GT5 and through the winding of the vertical magnet 2VM to battery. Although the upper winding of the relay CT is in parallel with the winding of the vertical magnet 2VM, relays CT will not operate over the circuit just traced.

Upon energization, vertical magnet 2VM raises its wiper shaft one vertical step, whereby the trunk circuit wipers TCW1 through TCW4 and vertical trunk wiper VTW are raised to the first bank contact level. At this time the vertical magnet interrupter springs 2VM/INT operate to open the previously traced energizing circuit of relay DR. Relay DR thereupon restores and at contacts DR4 opens the energizing circuit to the vertical magnet 2VM. Vertical magnet 2VM thereupon restores and at its interrupter springs 2VM/INT again completes the energizing circuit to relay DR. Relay DR upon energizing again completes the previously traced energizing circuit to the vertical magnet 2VM at contacts DR4. During the time that these last-mentioned operations were taking place, the vertical wiper completed a test of the first level of the vertical bank to determine whether a marking ground has been applied to this level by a calling line. Since the vertical trunk wiper VTW did not encounter a marking ground potential on the first level, no circuit is completed for the relay SR and all of the trunk circuit wipers will be raised to the next level in the same manner as described for raising them to the first level. The interaction between the vertical magnet 2VM and the stepping relay DR continues in the same manner to raise the trunk circuit wipers to the second level, at which time another test is made of the vertical bank by the vertical trunk wiper VTW. If no marking ground is found on the second vertical bank level by the vertical trunk wiper VTW, the trunk circuit wipers are raised to the next succeeding level in the same manner as previously described.

Since it was previously mentioned that the calling subscriber is the local subscriber S32, the previously traced marking potential is present on the third level of the vertical bank in the trunk circuit, therefore, when the trunk circuit wipers and the vertical trunk wiper VTW are raised to the third level, this marking ground is encountered by the vertical trunk wiper VTW for completing an operating circuit for the relay SR. This circuit for operating relay SR may be traced as extending from the grounded marked third level in the vertical bank, the vertical trunk wiper VTW, the break contact of CE3, the break contact of GT3, and through the right-hand winding of relay SR to battery.

In actuating its contacts, relay SR opens the self-interrupted circuit to the vertical magnet 2VM and the energizing circuit of relay DR at contacts SR2, completes a circuit for operating relay GT at contacts SR5 and at the contacts of SR1, SR3, SR4, SR6, SR7, SR8, and SR9 performs no useful function for the time being. The circuit for operating relay GT may be traced as extending from the grounded marked third level of the vertical bank, the vertical trunk wiper VTW, the break contacts of CE3, contacts SR5, and through the lower winding of relay GT to battery.

In actuating its contacts, relay GT performs no useful function for the time being at contacts GT1 and GT2, opens the previously traced energizing circuit of relay SR at the make contacts of GT3, provides a holding circuit by way of the upper winding of relay GT at contacts GT4, switches over the previously traced self-interrupted driving circuit of the vertical magnet 2VM to the rotary magnet 2RM at the make contacts of GT5, and performs no useful function for the time being at the contacts controlled by GT6 and GT7. The above-mentioned holding circuit for relay GT may be traced as extending from ground at the closed vertical off-normal springs VON/T3, to the right, and through the break contact of SW2, the break contacts of KT3, contacts GT4, the upper winding of relay GT and through resistance R12 to battery.

Upon releasing at this time, relay SR has no effect on the trunk circuit other than to complete the self-interrupting circuit to the rotary magnet 2RM when its contacts SR2 close. This self-interrupting circuit extends over the same previously traced path, with the exception that at the make contacts of GT5 the circuit extends in series through the windings of relay ET and rotary magnet 2RM to battery. This circuit, however, is not complete until relay DR energizes, at which time the closing of contacts DR4 completes the circuit to the rotary magnet 2RM. Even though relay ET operates in series with the rotary magnet 2RM, the operation thereof has no effect on the trunk circuit during this type of call.

Upon energization, rotary magnet 2RM advances the trunk circuit wipers TC1 through TC4 one step across the selected third level. Also upon energization, rotary magnet 2RM opens its interrupter contacts 2RM/INT to open the circuit to the stepping relay DR. Relay DR thereupon restores and at its contacts DR4 opens the energizing circuit of the rotary magnet 2RM. Upon restoring, rotary magnet 2RM closes its interrupter contacts 2RM/INT to again complete the circuit to the relay DR. This interaction between the stepping relay DR and the rotary magnet 2RM continues until the EC wiper TCW4 encounters the marked bank contact which has the marking ground applied thereto as previously described. At this time a circuit is completed for operating switching relay SW, which may be traced as extending from this grounded bank contact, the EC wiper TCW4, the break-after-make contact of SW10, the break contact of CE8 and through the lower winding of relay SW to battery.

It will be appreciated that the above-described marking grounds applied to the vertical bank of the trunk circuit and to the contact in the bank accessible by the EC wiper TCW4 are applied over circuits previously traced in this section.

In actuating its contacts, switching relay SW opens a point in a later-described "camp-on" holding circuit at contacts SW1, opens a point in the previously described holding circuit of relay GT at the break contacts of SW2 for releasing this relay, closes the line conductors at SW3 and SW4 for extending the loop of the calling line to operate line relay AT, extends ground at the make-before-break contacts of SW5 over the control (C) conductor and the control (C) wiper TCW3 for holding the line relay such as L of the calling local line circuit operated, opens the previously traced operating circuit to the stepping relay DR and the self-interrupting circuit of the rotary magnet 2RM at contacts SW6, maintains ground on the conductor leading to the supervisory lamp at the operator's position at the make contacts of SW7, completes the timing circuit from the 30-second pulse lead at contacts SW8 for operating relay SR as later described, completes a holding circuit at contacts SW9 for itself from battery and resistance R12 and over its upper winding to the grounded vertical off-normal contacts VON/T3 and completes a circuit at the make contacts of SW10 for operating relay K in the connector.

It will be noted at this time that the operation of relay SW at the make contacts of SW2 completes a circuit over the pulse start conductor for starting the operation of a time-delay circuit. The operation and function of this time-delay circuit will be described in detail later on in this section.

The circuit for operating relay K in the connector may be traced as extending from ground at the make contacts of B2, contacts C1, over the conductor through normally closed contacts of the transfer accept (TA) relay (not shown), from the TA relay contacts through contacts CL7, left normal post springs LNP1, right normal post springs RNP2, the EC conductor of the finder-connector link, contacts D6, the EC finder-wiper FW4 and engaged bank contact, the "S" wiring, out over the EC conductor and associated cable to the trunk circuit to mark the contact outlet in the EC contact bank, the trunk circuit EC wiper TCW4 engaging the marked contact, the make-before-break contact of SW10, the negative line conductor and wiper TCW1, the bank contact engaged by the wiper TCW1, back over the associated cable to the negative line conductor —L in the local line circuit, the contact engaged by the finder-wiper FW1, contacts D4, the negative line conductor —L of the finder-connector link, contacts CL6, J4, the conductor leading to contacts of the all-trunk-busy relay (not shown), the conductor leading from the contacts of all-trunk-busy relay through the right normal post springs RNP4, resistance R4 and through the upper winding of relay K to battery.

Figure 3:
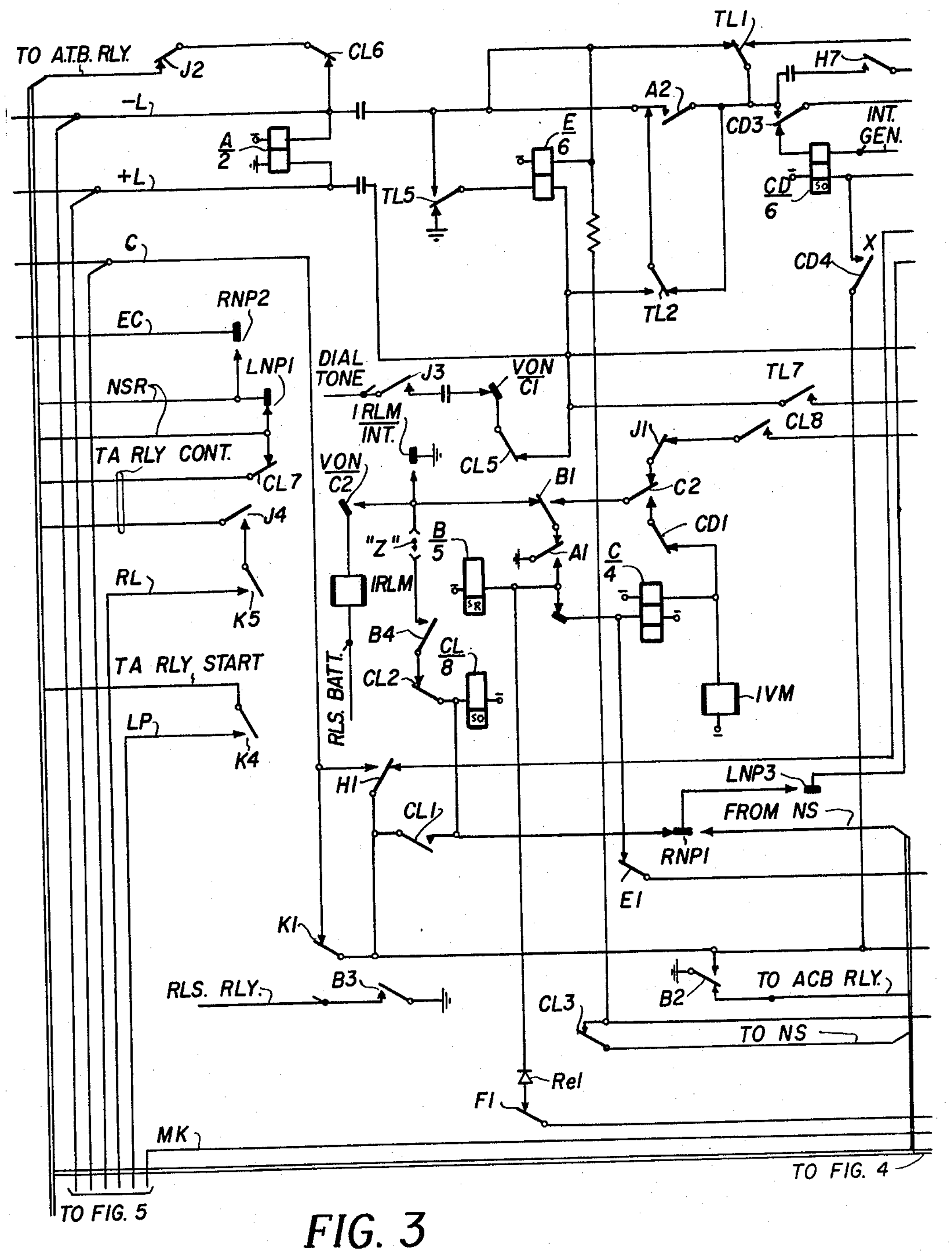
Figs. 3 and 4 show the connector portion of the disclosed finder-connector link, with conductors and cables leading therefrom to the trunk circuits and to the inquiry and transfer circuits.
Figure 4:
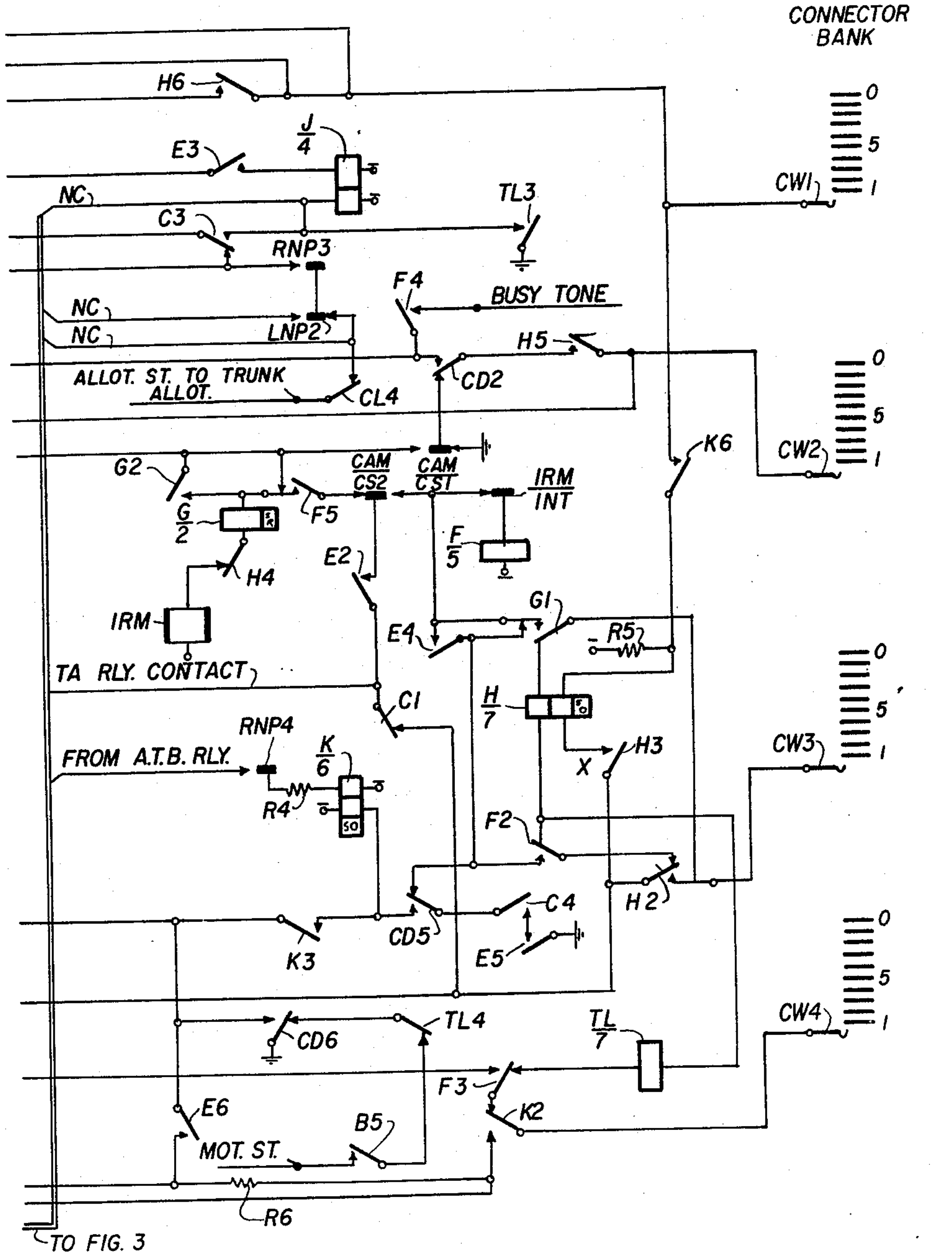

Referring to Figs. 1, 3 and 4, which represent the engaged finder-connector link, it will be noted that upon actuating its contacts K1, relay K opens a point in the control (C) conductor leading from the finder to the connector, while the remainder of the contacts operated by relay K have no effect on any of the circuits during the present type of call.

This opening of the C conductor by contacts K1 of relay K removes the holding ground to relay D in the finder, whereby relay D restores. The restoring of relay D at contacts D4 and D5 opens the —L and +L line conductors, whereby the loop circuit of the calling line is opened to the line relay A in the connector.

Line relay A in the connector thereupon restores and opens the make contacts of A1 to open circuit for releasing relay B. Relay B is constructed as being slow-to-release and will restore after a predetermined time interval to open the previously described operating circuit of relay K by opening the make contacts of B2. The closing of the make contacts of B1 completes an obvious circuit for operating the release magnet 1RLM, since the vertical off-normal contacts VON/C2 are closed. The release magnet 1RLM operates to restore the wipers of the connector to normal in a well-known manner. During the time that the release magnet 1RLM is restoring the connector wipers, relay K is also restoring so that at this time the particular finder-connector that was taken into use by the calling subscriber S32 has now completely restored and subscriber S32 is thereafter connected to the trunk circuit by way of its local line circuit, the conductors and associated cable leading therefrom and to the bank contacts in the trunk circuit banks which are now engaged by the trunk circuit wipers TCW1 through TCW4.

Reference will now be had with the trunk circuit comprising Figs. 7 through 10 for the remainder of the description of the present type of call. As was previously mentioned, line relay AT of the trunk circuit operated responsive to the calling subscriber's loop circuit being extended into the trunk circuit at the time that contacts SW3 and SW4 were closed. In actuating its contacts, line relay AT completes a circuit for relay BT at the make contacts of AT1 and at the make-before-break contacts of AT2, extends the calling loop (including the winding of relay LA) out over the A and B line conductors leading to the central office. The circuit for relay BT may be traced as extending from ground at the make contacts of AT1, the break contacts of DF6 and through the winding of relay DT to battery.

In actuating its contacts, relay BT performs no useful function during the present type of call at the operated contacts of BT2, BT3, and BT5, while at the make contacts of BT1 a point in the energizing circuit of relay CT is prepared and at the contacts controlled by BT4 an obvious ground potential is applied to the AL1 conductor leading to the trunk allotter for causing the allotter to release from the present trunk circuit in a well-known manner.

Upon release of the allotter from the trunk circuit, the ground potentials are removed from the previously-mentioned conductors AL3, AL4 and AL5 leading to the disclosed trunk circuit, whereby the previously-mentioned operating circuit of relay CR is opened, the ground is removed from the B line conductor leading to the central office for allowing relay LA to operate from the battery feed applied in a well-known manner at the central office and the previously-mentioned operating circuit to relay DR is no longer effective. At the time of its complete release, the trunk allotter disconnects from the AL1 through AL6 conductors leading to the disclosed trunk circuit by stepping its wipers (not shown) to engage similar conductors of the next free or idle trunk circuit.

Relay LA operates over the circuit, as described above, and at contacts LA1 completes an obvious circuit for holding relay CR operated, even though this relay is in the process of restoring, as described above.

At this stage of the operation it will be noted that the calling subscriber S32 is now connected to the trunk line conductors A and B, which terminate at the central office. Responsive to dial tone being received from the central office, the calling subscriber S32 may now dial the desired call number, with the equipment in the central office functioning in a well-known manner to further extend the call to the desired party. The line relay AT of the trunk circuit also functions in a well-known manner responsive to receipt of dial pulses for further repeating these pulses to the central office by means of its make-before-break pulsing contacts AT2 as will hereafter be described.

Responsive to the receipt of the first pulse of the particular dialled digit, line relay AT restores and at the break contacts of AT1 completes a circuit for energizing relay CT, while the opening of the make-before-break contact of AT2 opens the circuit to temporarily remove the winding of relay LA from the aforementioned loop circuit.

The circuit for operating relay CT may be traced as extending from ground at the break contacts of AT1, the make contacts of BT1, the break contacts of PS7, the break contacts of CE2 and through the lower winding of CT to battery. It will be noted that relay CT is constructed as being slow-to-release, so that it will therefore operate on the first release of line relay AT and remain operated during each series of pulses. In actuating its contacts, relay CT performs no useful function at the contacts of CT1 during the present type of call, while an obvious alternate locking circuit for relay CR is completed at the make contacts of CT2, no useful function is performed at contacts CT3 and at contacts CT4 an obvious short-circuit of the windings of relay LA and the repeating coil is completed to remove the impedance from the pulsing circuit and thus improve the pulsing.

Relay LA will restore during the impulsing, however it will not effect the circuits of the trunk circuit during impulsing since relay CR is held operated by way of the make contacts of CT2 as previously described. Relay CT will restore at the end of dialling after a lapse of a reasonable length of time, at which time the winding of relay LA and the windings of the repeating coil are again connected into the loop circuit extended to the central office. Relay LA thereafter operates and maintains relay CR operated by way of its contacts LA1, as previously described. Thus it is seen that upon completion of dialling, the calling subscriber AC2 is now connected through to the desired called party by way of the trunk circuit. Conversation may now take place in the usual manner.

On outgoing direct access calls to subscribers such as served by the central office, a time-delay circuit is provided for maintaining the impulse-repeating circuit complete to the desired subscriber for a period long enough to permit the dialling of all of the digits in the called subscriber's call number. This delay circuit is rendered effective at the time that the switching relay SW operates and dial tone is returned from the distant office to the calling subscriber. This time delay may range from 30 to 50 seconds and is considered of a long enough duration to permit the dialling of 10 average digits without abnormal delays in manually operating the dial for each digit. At the time that the switching relay SW operated to close the make contacts of SW2, a circuit was completed over the pulse start lead as previously mentioned for starting the time delay equipment (not shown). This circuit may be traced as extending from ground at vertical off-normal contacts VON/T3, over and up through the make contacts of SW2, down through contacts TR6, rectifier 1RE1, the break contacts of SR3, contacts Z1 and out over the pulse start lead to the time-delay equipment. The closing of contacts SW8 by the switching relay SW connected the 30-second pulse conductor, also as previously mentioned, to the trunk circuit for operating relay SR. This circuit for operating relay SR may be traced as extending from the first ground pulse on the 30-second pulse conductor, the break contacts of PS4, contacts SW8, CR3, the break contacts of Z2, through the left-hand winding of relay SR and resistance R15 to battery.

In operating, relay SR provides an alternate path for applying ground to the pulse start conductor at the make contacts of SR3, while the closing of the make contacts of SR4 completes a circuit for operating relay Z when the first pulse of ground is removed from the 30-second pulse conductor. The operation of the other contacts of relay SR have no effect on the trunk circuit for the present type of call. It will be noted that relay Z will operate in series with relay SR at the time that this first pulse of ground is removed from the 30-second pulse conductor. This circuit for operating relay Z in series with relay SR may be traced as extending from ground at the vertical off-normal contacts VON/T3, through the make contacts of SW2, contacts TR6, rectifier 1RE2, the upper winding of relay Z, contacts CR4, the make contacts of SR4, through the left-hand winding of relay SR and resistance R15 to battery. Relay SR now holds operated in series with relay Z as described above.

In actuating its contacts, relay Z opens a point in the previously traced pulse-start circuit at contacts Z1 and leading to the time delay circuit, the closing of the make contacts of Z2 prepares a point in a shunting circuit to relay SR and also prepares a point in the circuit for holding relay Z operated over its lower winding, the closing of contacts Z3 completes a holding circuit for maintaining relay Z operated after the first ground pulse is taken off of the 30-second pulse conductor, while the operation of contacts Z4 and Z5 have no effect on the trunk circuit during the present type of call. When the second ground pulse is received over the 30-second pulse conductor, the previously-mentioned circuit for shunting relay SR is rendered effective to cause this relay to restore. This shunting circuit may be traced as extending from the second ground pulse on the 30-second pulse conductor, the break contacts of PS4, contacts SW8, CR3, the make contacts of Z2, down and through contacts DF2 and through the left-hand winding of relay SR to the ground potential applied thereto over the previously traced circuit from the grounded vertical off-normal contacts VON/T3.

The circuit for holding relay Z operated during this pulse of ground potential may be traced as extending from the second ground pulse on the 30-second pulse conductor, the break contacts of PS4, contacts SW8, CR3, the make contacts of Z2, the lower winding of relay Z and through resistance R14 to battery.

Relay SR restores, due to the above-mentioned shunt, and at the closing of contacts SR6 an obvious circuit is completed from ground and the make contacts of Z4 for operating relay PS. In actuating its contacts, relay PS completes an obvious locking circuit for itself to ground at the vertical off-normal contacts VON/T3 by way of its contacts PS1, short-circuits the pulsing contacts AT2 at contacts PS2 to prevent any further pulsing for the time being, performs no useful function during the present at the make contacts of PS3, changes over to the four-second pulse conductor at the make contacts of PS4, removes ground from the motor start conductor at contacts PS5, prepares a point in the abandoned call supervisory lamp circuit at the make contacts of PS6, opens the normal pulsing circuit to the rotary magnet 2RM and the vertical magnet 2VM at the break contacts of PS7 and at contacts PS8 prepares a point in the inquiry circuit to relay TR.

Upon returning to the point in the description where it was stated that the desired connection was established, it will be noted that at the end of conversation and responsive to the calling subscriber S32 disconnecting first, line relay AT is the first relay in the trunk circuit to restore followed by the release of relays LA and CR. The loop circuit leading to the central office is opened at the make contacts of AT2 to release the line equipment at the central office, while an obvious circuit is completed for operating relay DF over its upper winding by way of the break contacts of AT1.

Relay DF maintains relay BT operated over a holding circuit which may be traced as extending from ground at vertical off-normal contacts VON/T3, over through the make contacts of SW2, contacts CS2, the make contacts of DF6 and through the winding of relay BT to battery. The operation of the remaining contacts of relay DF have no effect on the trunk circuit during this type of call.

The release of relay CR has no effect on the trunk circuit other than to complete an operating circuit for relay CS at the break contacts of CR8. This circuit may be traced as extending from ground at the make contacts of BT2, the break contacts of CR8, contacts CE6 and through the winding of relay CS to battery.

It is not considered necessary at this time to describe the detailed operations of the various contacts of the relay CS, with the exception that the opening of contacts CS2 opens a previously described circuit to the relay BT, which after a reasonable lapse of time will restore.

Upon restoring, relay BT completes a circuit to the release magnet 2RLM at the break contacts of BT1. The operations of the other contacts of relay BT will not be described at this time. The circuit for operating the release magnet 2RLM may be traced as extending from ground at the break contact of AT1, the break contacts of BT1, contacts CR1, vertical off-normal contacts VON/T2 and through the winding of the release magnet 2RLM to the battery at the release alarm. Release magnet 2RLM now restores the wipers TCW1 through TCW4 to normal in a well-known manner and at the time that these wipers reach their normal position all of the vertical off-normal contacts restore to their normal positions. In particular, vertical off-normal contacts VON/T3 open to remove the holding circuit to all of the operated relays in the trunk circuit and they in turn will restore.

If the called party should replace his receiver first, there is no condition returned to the trunk circuit from the distant office and the connection is held until the calling party hangs up, at which time the equipment restores as previously described. The equipment is now at normal and conditioned to handle future calls.

*Information call from local subscriber*

Before starting the operational description of the above-mentioned type of call, reference will first be had with the trunking diagram comprising Figs. 11 and 12. In order to describe the above-mentioned call it will be assumed that the local subscriber station such as S32 in the first group of subscriber lines desires to place an information call with the operator located at the attendant's cabinet. Therefore, from the trunking diagram, it will be noted that special reference will hereafter be had with Figs. 1, 2, 3, and 4 of the drawings which are shown in detail, and with the block diagrams of the trunking diagram that represent the information trunks and the attendant's cabinet. In order to more easily follow this description, Figs. 1, 2, 3 and 4 should be arranged as described in the previous section entitled "Call from local subscriber to local subscriber."

It is assumed that the subscriber S32 has acted to initiate a call by removing his receiver to complete his line loop circuit, also in the same manner as previously described. It is further assumed that the distributor such as disclosed in Fig. 2 operates in response to the initiated call, also in the same same manner as previously described, to select an idle finder-connector link such as disclosed in Figs. 1, 3, and 4, and to start the operation of the finder to cause it to hunt for and connect with the line of the calling subscriber S32.

At this stage of the operational description, it will be noted that the same relays are operated and the circuits of the finder-connector link are in the same condition as described in the previous section entitled "Call from local subscriber to local subscriber" up to and including the point in the description where the calling subscriber has received dial tone and the connector is conditioned to receive impulses corresponding to the first dialled digit of the called number.

In the case of the present information call, wherein the operator is to be called by the subscriber S32, the single digit "0" is assumed to be the information call number that must be dialled by subscriber S32 to complete an extension for signalling the operator.

Responsive to the receipt of dial tone, the subscriber S32 dials the digit "0," thereby causing line relay A of the connector to restore and reoperate a total of ten times each. Upon each restoration of line relay A, the pulsing circuit is completed at the break contacts of A1 for energizing vertical magnet 1VM over a previously described path. After the first pulse has operated vertical magnet 1VM and it in turn has opened vertical off-normal springs VON/C3, the remaining pulses are thereafter effective as previously described for holding relay C operated during receipt of the remainder of the digital train of impulses. Since line relay A remains operated at the end of the first train of impulses, the above-mentioned pulsing and pulse-holding circuits are opened to the vertical magnet 1VM and relay C, respectively, at the make contacts of A1. As relay C is constructed as being slow-to-release, it will completely restore at the end of a predetermined period of time after the first digital train of impulses has ceased. It will be noted that the connector wipers CW1 through CW4 have been stepped to the tenth level of the contact bank responsive to the receipt of impulses corresponding to the dialled digit "0."

Responsive to the connector wipers being raised to the tenth level of the contact bank, all right normal post springs RNP and left normal post springs LNP operate.

In operating, left normal post springs LNP1 opens a point in the previously described marking circuit, which marks the vertical level and bank contact outlet in the trunk circuit, left normal post springs LNP2 opens a point in the trunk distributor start circuit and left normal post springs LNP3 prepares a point in the operating circuit of relay E. In operating, right normal post springs RNP1 prepares a further point in the operating circuit of relay E, right normal post springs RNP2 operate with no effect on the circuits during the present type of call and right normal post springs RNP3 completes the operating circuit of relay E. This operating circuit for relay E is maintained complete during the slow-to-release period of relay C and may be traced as extending from ground at the make contacts of B2, the break contacts of H1, the make contacts of C3, through the night circuit NC (not shown), left normal post springs LNP2, right normal post springs RNP3, left normal post springs LNP3, right normal post springs RNP1, through the night service equipment NS (not shown), contacts CL3 and through the resistance and upper winding of relay E to battery.

In actuating its contacts, relay E performs no useful function at contacts E1, E3 and E6 during the present type of call, while the closing of contacts E2 prepares a point in the self-interrupted circuit to the rotary magnet 1RM, the closing of contacts E4 prepares a point in a future holding circuit for relay F and the closing of contacts E5 completes a circuit which is effective during the slow-to-release period of relay C for operating relay F. This circuit for operating relay F may be traced as extending from ground at contacts E5, contacts C4, the break contacts of CD5, the break-after-make contacts of G1, rotary interrupter contacts 1RM/INT, and through the winding of relay F to battery.

In actuating its contacts, relay F performs no useful function during the present type of call at its contacts F1, its make contacts at F3 and its contacts at F4, while a holding circuit is completed for itself at the make contacts at F2 and a series operating circuit is completed at the make-before-break contacts of F5, when relay C releases, for operating relay G and rotary magnet 1RM. The holding circuit of relay F may be traced as extending from ground at the make contacts of B2, the break contacts of H2, the make contacts of F2, contacts E4, rotary magnet interrupter springs 1RM/INT and through the winding of relay F to battery. The series operating circuit of relay G and rotary magnet 1RM may be traced as extending from ground at the make contacts of B2, contacts C1, E2, cam springs CAM/CS2, the make-before-break contacts of F5, the winding of relay G, contacts H4 and through the winding of rotary magnet 1RM to battery.

Before continuing with the present description, it is thought advisable to mention at this time that while the trunking diagram comprising Figs. 11 and 12 is shown as having only two information trunks leading to the attendant's cabinet, it is assumed that there may be more trunks than these two. It is also assumed that the vacant contacts in the tenth level of the connector contact bank are so connected that these vacant contacts will test busy in any well-known manner when the connector wipers engage them during a search for an idle information trunk. Upon operating in series with the rotary magnet 1RM, relay G performs no useful function during the present type of call at contacts G2, while the closing of the make-before-break contacts of G1 prepares a point in the busy test circuit for the relay F. Upon energizing, rotary magnet 1RM opens its interrupter contacts 1RM/INT for releasing relay F. Upon restoring, relay F opens its holding circuit at the make contacts of F2, prepares a point in the operating circuit of relay H at the break contacts of F2 and opens the series circuit to relay G and the rotary magnet 1RM at the make-before-break contacts of F5.

Since relay G is constructed as being slow-to-release, this relay will not restore for the present, while rotary magnet 1RM will restore at this time and advance the connector wipers CW1 through CW4 a first rotary step to engage the first set of bank contacts in the tenth level. If it is assumed at this time that the first information trunk is connected to this first set of bank contacts and that this trunk is busy, a busying ground is applied to the control conductor of this trunk and it is encountered by the control wiper CW3, which extends this ground to reoperate relay F. This circuit for reoperating relay F may be traced as extending from the ground encountered by the control wiper CW3, the break-after-make contacts of H2, the make-before-break contacts of G1, rotary magnet interrupter contacts 1RM/INT and through the winding of relay F to battery. Relay F thereupon recompletes the series operating circuit for relay G and rotary magnet 1RM before relay G has had time to restore. Rotary magnet 1RM will thereupon reoperate to again open its interrupter contacts 1RM/INT to release relay F. Upon restoring, relay F again opens the series operating circuit of relay G and rotary magnet 1RM, whereby rotary magnet 1RM will restore to advance the connector wipers a second rotary step. Relay F again tests the busy or idle condition of this second set of contacts, which represent the second information trunk. If it is assumed at this time that this second information trunk is idle, no busying ground is encountered by the control wiper CW3 and a battery potential is encountered thereby instead.

It will be noted that under the above-mentioned idle condition of the second trunk, relay F will not reoperate and that relay G will restore after a reasonable length of time to complete and operating circuit for relay H at the break contacts of G1. This circuit for operating relay H may be traced as extending from ground at the make contacts of B2, the break-before-make contacts of H2, the break contacts of F2, the left-hand winding of relay H, the break-before-make contacts of G1, the break-after-make contacts of H2, wiper CW3 and engaged bank contact, the control conductor of the second information trunk and through the winding of an answer relay (not shown) therein to battery. It will be noted that this answer relay in the second information trunk operates in series with relay H of the connector.

In actuating its contacts, relay H first closes its "X" contacts H3 to complete its own locking circuit by way of its right-hand winding to the grounded make contacts of B2, opens the previously traced operating circuit of relay E at the break contacts of H1, opens its initial operating circuit at the make-before-break contacts of H2, opens a point at contacts H4 in the series operating circuit of relay G and rotary magnet 1RM to prevent any further rotary operation of the connector, completes a circuit at contacts H5 and H6 for signalling the operator in a well-known manner and completes a circuit at contacts H7 for returning ring-back tone to the calling subscriber also in a well-known manner.

Although the following is not shown, the answer relay in the engaged second information trunk operates in a well-known manner to light an answer lamp at the operator's position in the attendant's cabinet to inform the operator thereat that an incoming call is awaiting disposition.

The ring cut-off relay CD operates responsive to the operator answering the call for completing the talking connection between the calling subscriber S32 and the operator. The back-bridge, or battery feed, relay E is operated responsive to the completion of the talking connection by the operation of relay CD for completing a circuit at contacts E6 to maintain relay B operated, thus providing the previously described last-party release feature.

The operator at the attendant's cabinet may now converse with subscriber S32 and provide the type of information service that subscriber S32 desires.

It will be noted that in case the second information trunk is tested and assumed to be found busy, the connector wipers are advanced to the next successive set of bank contacts in the same manner as previously described. In the event that all of the information trunks are tested and found busy, the connector-wipers are also stepped beyond the vacant contacts, since it has previously been mentioned that these vacant contacts are grounded to make them test busy. If all the trunks and vacant contacts in the tenth level are tested and found busy, the connector-wipers are advanced to the eleventh position, at which time the cam springs CAM/CS2 are opened to prevent further rotary operation by opening the series operating circuit of relay G and rotary magnet 1RM. In this manner relay F operates from the busying ground, while the rotary magnet 1RM is prevented from operating and cannot restore relay F as previously described. Relay F causes busy tone to be returned to subscriber S32 in a well-known manner by way of its contacts F4.

However, since it has been described that the connection between the calling subscriber S32 and the operator has been established over the second information trunk, the equipment is restored to normal at the end of conversation in a manner such as previously described, thereby conditioning the equipment to handle future calls.

*Inquiry call by local subscriber during an outgoing trunk call by the local subscriber*

Before starting the operational description of the above-mentioned type of call, reference will first be had with the trunking diagram comprising Figs. 11 and 12. It will be appreciated that in order to make the above-mentioned inquiry call, specific reference will be had with Figs. 1 through 10, inclusive, and that these drawings should be arranged as shown in the trunking diagram. In order to describe the above-mentioned call, it will be assumed that the local subscriber station, such as S32 in the first group of subscriber lines, has placed an outgoing trunk call to a subscriber located in an exchange not shown but served by the central office, all of which has been described in the previous section entitled "Outgoing trunk call from local subscriber to central office." It will further be assumed that after the above-mentioned outgoing trunk call has been established and conversation between the calling P.A.B.X subscriber S32 and the called subscriber in the exchange served by the central office is taking place, a question arises whereby it is necessary for subscriber S32 to call another local P.A.B.X subscriber and yet maintain the connection with the present call subscriber in the exchange served by the central office. For the sake of simplicity it will be assumed that the local P.A.B.X subscriber with whom subscriber S32 desires to place an inquiry call is the local subscriber S62.

Therefore, before the above-mentioned inquiry call is to be initiated, it is thought best to review the necessary prior operations. First, it will be assumed that subscriber S32 has initiated a call, wherein his line has been seized by the finder-connector link such as disclosed in Figs. 1 through 4 and described in the section entitled "Call from local subscriber to local subscriber." Responsive to the receipt of dial tone, subscriber S32 dials the single digit "9" to initiate an outgoing trunk call in the same manner as previously described in the section entitled "Outgoing trunk call from local subscriber to central office." The finder-connector link releases from the connection responsive to the calling line of subscriber S32 being seized by the trunk circuit, also as previously described. Responsive to dial tone being received from the central office, subscriber S32 now dials the number of the desired called party, whereby the connection with the desired called subscriber is established in the same manner as previously described and conversation may thereafter take place. The inquiry call may hereafter be placed as will be explained in detail.

It will be noted that in order to originate an inquiry call, the local subscriber S32 must dial the digit "2" to cause the necessary operations.

A further review of the section entitled "Outgoing trunk call from local subscriber to central office" will reveal that at the time that the outgoing trunk call is established with the desired called party, the switching relay SW of the trunk circuit is operated. Therefore, when subscriber S32 desires to extend an inquiry call to the local P.A.B.X subscriber S62 and dials the digit "2," the line relay AT of the trunk circuit will restore and reoperate a total of two times each.

Upon the first restoration of line relay AT, a circuit is completed for operating relay DF by way of the break contacts at AT1. This circuit for operating relay DF may be traced as extending from ground at the break contacts of AT1, the make contacts of BT1, the make contacts of PS7, the break contacts of SR8 and through the upper winding of relay DF to battery. Relay DF operates extremely fast and at its "X" contacts DF5 completes its own locking circuit, at contacts DF2 opens the circuit to remove battery resistance R14 and lower winding of relay Z from being connected in multiple with resistance R15 and battery, prepares a point in the operating circuit of relay SR at contacts DF4 and completes a holding circuit at the make contacts of DF6 for relay BT from the grounded vertical off-normal contacts VON/T3, while the remainder of the contacts operated by relay DF have no effect on the circuit during the present type of call. The locking circuit for relay DF may be traced as extending from ground at the break contacts of CS7, the break contacts of CT2, contacts TC6, DF5 and through the lower winding of relay DF to battery.

When line relay AT reoperates after its first release, due to the dialing of the digit "2," a circuit is completed for operating relay SR. This circuit may be traced as extending from ground at the make contacts of AT1, contacts DF4, the left-hand winding of relay SR, and through resistance R15 to battery.

Upon operating, relay SR prepares a future circuit at the make contacts of SR8, whereby the second release of line relay AT will complete a circuit for operating relay CT, while the operation of the remainder of the contacts of relay SR have no effect on the circuit during the present type of call.

Responsive to line relay AT releasing during the second impulse, a circuit is completed for relay CT which may be traced as extending from ground at the break contacts of AT1, the make contacts of BT1, the make contacts of PS7, the make contacts of SR8, the break contacts of CE2, and through the lower winding of relay CT to battery. It will be noted at this time that the operation of relay SR opens the holding circuit of relay PS at contacts SR6. However, relay PS is constructed as being slow-to-release and will not completely restore as will hereafter be described.

In actuating its contacts, relay CT performs no useful function at the make contacts of CT1, while the opening of the break contacts of CT2 opens the previously-traced locking circuit of relay DF to cause this relay to restore, and the closing of contacts CT3 prepares a point in the operating circuit of relay TR, with this circuit being effective at the time that relay DF restores. Therefore, the restoration of relay DF will complete the energizing circuit to relay TR at contacts DF1 and will open the previously-traced energizing circuit of relay SR at contacts DF4. The operation of the remainder of the contacts of relay DF have no effect on the circuit during the present. This circuit for operating relay TR may be traced as extending from ground through contacts of the all-connector-busy relay (not shown) contacts TS5 in Fig. 6 of the inquiry and transfer circuit, conductor 1TS1 leading to the trunk circuit, contacts GT2, PS8, DF1, CT3 and through the winding of relay TR to battery.

When line relay AT reoperates at the end of the second impulse, the previously-traced energizing circuit to relay CT is opened and since relay CT is constructed as being slow-to-release, it will subsequently restore after the expiration of a predetermined time, with no effect on the circuits thereafter. At this time it will be noted that the hold circuit of relay DF has been opened by relay CT as previously mentioned, thereby allowing relay DF to restore. The restoring of relay DF opens the previously mentioned operating circuit of relay SR at contacts DF4. Relay SR may tend to restore at this time, but the operation of relay TR will maintain relay SR operated as will hereafter be described. It will further be noted at this time that although its holding circuit has been opened, relay PS does not restore, because the restoring of relay DF maintains relay PS operated over a different holding circuit, which may be traced from ground at the vertical off-normal contacts VON/T3, contacts CR5, PS1, DF7 and through the winding of relay PS to battery.

In actuating its contacts, relay TR operates "X" contacts TR1 to complete a holding circuit for itself, holds relay SR operated by way of "X" contacts TR2, applies a marking battery to the 1FT conductor leading to the inquiry circuit by way of its make contacts at TR3, extends a marking ground, or start, potential by way of contacts TR4 to the 1TS conductor leading to the inquiry circuit, closes make-before-break contacts TR5 and TR11 to extend the local line loop to the inquiry and transfer circuit, opens the previously described holding circuit of relay C at contacts TR6, performs no useful function during the present at contacts TR7, places the trunk circuit in a hold condition by completing a circuit including contacts TR8 and resistance R13, which are across the windings of line relay AT for maintaining this relay operated, prepares a point in the future operating circuit of relay TRA at contacts TR9 and prepares a point in a later described shunting circuit of relay SR at contacts TR10. The holding circuit for relay TR may be traced as extending from ground at the break contacts of TRA6, the make-before-break contacts of SR9, the cam springs CAM/TS3, "X" contacts TR1 and through the winding of relay TR to battery. The holding circuit for relay SR may be traced as extending from ground at the vertical off-normal contacts VON/T3, contacts TRA1, "X" contacts TR2 through the left-hand winding of relay SR and resistance R15 to battery. The marking, or start, ground potential applied as previously described during the operation of contacts TR4 to the 1TS conductor leading to the inquiry and transfer circuit may be traced as extending from ground at vertical off-normal conacts VON/T3, contacts TRA1, TR4, conductor 1TS leading to the inquiry and transfer circuit, the break contacts of TSW1, contacts EB2, DB4, HT4 and through the winding of relay TS (Fig. 5) to battery.

Before continuing further with the present description, it is thought best to mention at this time that the two relays TSW and EB are shown as being included in the inquiry and transfer circuit. These relays only have utility when the system requires the provision of more than one inquiry and transfer circuit and since it is assumed that there are two inquiry and transfer circuits used in the present system, the purpose of these relays will be described more in detail later on in this specification. It is also thought advisable to mention at this time that while there may be a total of twenty trunk circuits available for use in this system, the instant trunk circuit such as shown in Figs. 7, 8, 9, and 10 may be assumed to be the first trunk circuit and is therefore connected by means of the conductors 1−, 1+, 1RL, 1H, and 1FT to the second contacts in the banks accessible by the trunk-finder wipers TFW1 through TFW5, respectively. It will also be noted that there are multiple connections from the other trunk circuits to the conductors 1TS1 and 1TS. It will further be noted that as previously mentioned, wherein the finder-connector links are arranged in two groups, the finder-connector link disclosed in Figs. 1, 2, 3, and 4 is assumed to be the first link in the first group and is therefore connected by means of conductors −L, +L, C, RL, LP, and MK to the first and thirteenth contacts in the banks accessible by the connector-finder wipers CFW1 through CFW6, respectively.

Returning now to the operation of the inquiry and transfer circuit, wherein relay TS is operated over the previously described circuit: the closing of contacts TS1, TS2 and TS3 completes a self-interrupted driving circuit to the connector-finder magnet CFM with the circuit being effective in case the connector-finder wiper CFW4 encounters a ground potential to represent a busy finder-connector link, prepares a point in the operating circuit of relay FT at the make-before-break contacts of TS4, busies the present inquiry and transfer circuit to other calls by opening the 1TS1 conductor at contacts TS5, prepares a point in a future alternate holding circuit for itself at contacts TS6, and at contacts TS7 completes an obvious circuit from ground at the break contacts of FT1 for operating the trunk finder magnet TFM.

It will be assumed that the connector finder wiper CFW4 is engaged with a contact which has a grounded control (C) conductor connected thereto. This ground is therefore effective for operating the connector-finder magnet CFM over an obvious circuit and is further effective for shunting the relay HS. In this shunting circuit of relay HS, the ground potential renders the application of battery through resistance R7 and contacts TS3 ineffective.

Upon energizing, connector-finder magnet CFM opens its own energizing circuit at its interrupter contacts CFM/INT and upon restoring, advances its wipers CFW1 through CFW6 inclusive, one step. This self-interrupted action of connector-finder magnet CFM continues until wiper CFW4 does not encounter a ground or busying potential. This shunting circuit of relay HS is thereby ineffective and relay HS operates over a circuit which may be traced from battery, resistance R7, contacts TS3 and through the winding of relay HS to ground.

As previously mentioned, the operating circuit to the trunk finder magnet TFM was completed at the same time that the circuit to the connector-finder magnet CFM was completed. In operating, the trunk-finder magnet TFM opens its own energizing circuit at its interrupter contacts TFM/INT and upon restoring, advances its wipers TFW1 through TFW5 inclusive, one step. As was previously mentioned, the disclosed trunk circuit was described as being the first trunk circuit of the group and was connected to the second contacts of the banks accessible by the trunk finder wipers TFW1 through TFW5. Therefore, as wiper TFW5 engages the second contact of its bank, the marking battery potential applied to the conductor 1FT from the trunk circuit, as previously described, is effective for operating relay FT in the inquiry and transfer circuit in an obvious manner. It will be appreciated that if a trunk circuit, other than the first one of the group, were the trunk circuit applying the marking potential to the bank contact accessible by wiper TFW5, the trunk finder magnet TFM would interrupt its own circuit to cause it to advance its wipers until this marking battery potential of this other trunk were found.

In operating, relay FT opens the break contacts at FT1 to open the operating circuit of the trunk finder magnet TFM and closes the make contacts of FT1 to complete its own locking circuit over its lower winding to the marking battery in the engaged trunk circuit.

At this stage of the operational description it will be noted that the associated wipers of the connector-finder magnet CFM are connected with an idle connector, while the wipers associated with the trunk finder magnet TFM are engaged with the trunk circuit that is in use and has been placed in a hold position by subscriber S32.

In actuating its contacts, relay HS opens the operating circuit at contacts HS1 to the connector-finder magnet CFM, applies ground potential by way of the make contacts of HS2 to the C conductor of the seized connector to guard it against seizure during its present use, completes the pulse start circuit at contacts HS3 to start the pulsing equipment (not shown), applies ground potential to the LP conductor leading to the connector, closes contacts HS5 to prepare a point in the operating circuit for relay DB and at contacts HS6 completes a circuit for operating relay HT. The circuit for operating relay HT may be traced as extending from ground at contacts of HS6, the break contacts of DB1, through the winding of relay HT, make-before-break contacts of TS7, trunk finder magnet interrupter springs TFM/INT and through the winding of trunk finder magnet TFM to battery. Trunk finder magnet TFM will not operate over the above-traced circuit and only relay HT will operate.

In actuating its contacts, relay HT closes contacts HT1 and HT5 to extend the loop from calling subscriber S32 through the trunk circuit, the inquiry and transfer circuit and into the connector circuit, completes an obvious alternate holding circuit for relay TS at contacts HT2, extends ground to complete a circuit at the make-before-break contacts of HT3 for shunting relay SR in the trunk circuit and also operate relay TSW, opens the previously-traced energizing circuit of relay TS at contacts HT4 and at contacts HT6 opens the circuit including contacts of the all-connector-busy relay (not shown) to remove ground from the twenty-fifth bank contact accessible by the connector-finder wiper SFW4 to remove the all-connector-busy marking applied thereto.

The circuit for operating relay TSW may be traced as extending from ground at the make contacts of HS2, contacts TS1, the make-before-break contacts of HT3 and through the upper winding of relay TSW to battery. The operation of relay TSW will be explained in detail later on in this section.

The circuit for shunting relay SR in the trunk circuit may be traced as extending from ground at the make contacts of HS2, contacts TS1, the make-before-break contacts of HT3, trunk finder wiper TFW4 and engaged bank contact, conductor 1H to the trunk circuit, contacts TR10, break contacts of TRA3 and through the left-hand winding of relay SR. As previously mentioned, the left-hand winding of relay SR also has ground potential applied from the opposite direction by way of vertical off-normal contacts VON/T3 over a previously traced circuit.

Relay SR thereupon restores and at contacts SR1 completes an obvious circuit for operating relay TRA over its left-hand winding, while the restoring of the make-before-break contacts of SR9 transfers the holding circuit of relay TR to the previously described grounded 1H conductor leading to the inquiry and transfer circuit. The restoring of the remainder of the contacts of relay SR has no effect on the circuit during the remainder of the present call.

In actuating its contacts, relay TRA opens the previously described operating circuit of relay SR at contacts TRA1, provides no useful function for the time being at the closing of the make contacts at TRA2, the make contacts of TRA3 open the previously described shunting circuit for relay SR, an alternate holding circuit for line relay AT is completed over an obvious path at contracts TRA4, no useful function is provided during the present call at the operation of contacts TRA5, the make contacts of TRA6 provides no useful function for the time being, a supervisory lamp circuit in the operator's position (not shown) is maintained at the make contacts of TRA7 and the closing of contacts TRA8 completes an obvious locking circuit for relay TRA over its right-hand winding.

At this stage of the operational description, dial tone is returned from the local connector to the calling subscriber S32 over the established loop circuit in a well-known manner. Responsive to the receipt of dial tone, subscriber S32 now dials the call number of subscriber S62 to establish a connection therewith in the same manner as previously described in the section entitled "Call from local subscriber to local subscriber."

If it is assumed that subscriber S62 is not busy, conversation may proceed between subscriber S32 and subscriber S62 in the previously described manner. If, at the end of the inquiry call with subscriber S62, subscriber S32 desires to return to the connection with the party being held over the trunk circuit, subscriber S32 will request that subscriber S62 hang up his receiver, at which time the ground potential is removed from the 1H conductor (in a manner to be described in detail later on in this section) leading to the trunk circuit from the inquiry and transfer circuit to cause the release of relay TR. In restoring, relay TR opens the previously-traced energizing circuit to the relay TRA at contacts TR9 and recompletes the pulse start circuit at contacts TR6, while the closing of contacts TR7 connects 60 IPM of ground to the circuit for operating relay SR. This latter circuit may be traced as extending from the pulse of ground over the 60 IPM conductor, contacts TR7, make contacts of TRA2, make contacts TS4, contacts SW8, CR3, break contacts of C2, the left-hand winding of relay SR and through resistance R15 to battery. Relay SR operates at this time, and at the time that the ground pulse is removed from the 60 IPM conductor, a circuit is completed at the make contacts of SR4 for operating relay Z in series with relay SR over a previously-traced circuit including the ground from the vertical off-normal contacts VON/T3. Relay Z opens the previously described holding circuit of relay TRA by opening the break contacts of Z4, whereby relay TRA now restores.

It will be noted that the restoring of relay TR at the make-before-break contacts of TR5 and TR11 opened the connection extending the line conductors to the inquiry and transfer circuit and reconnected these conductors to the outgoing trunk circuit conductors and the opening of contacts TR8 opened the previously described first holding circuit placed across the windings of the line relay AT. The previously described alternate holding circuit, however, is maintained on the line relay AT by means of the contacts TRA4 and this holding circuit is effective until relay TRA restores these contacts. At this time subscriber S32 is again connected with the first called subscriber served by the central office exchange and conversation may continue or subscriber S32 may subsequently place a second inquiry call in the same manner as just described.

Upon returning to the operations of the connector and the inquiry and transfer circuit at the time that the called subscriber S62 answered the call, it will be noted that the ring cut-off relay CD in the connector operated in a manner as previously described to cause the operation of relay E in the connector, also in a manner as previously described. The operation of relay E completed a circuit for operating relay DB in the inquiry and transfer circuit, with this circuit being traced as extending from ground at the make contacts of CD6, contacts E6, the conductor MK leading from the connector to the bank contacts accessible by the connector-finder wiper CFW6 of the inquiry and transfer circuit, contacts HS5, the break contacts of TB3 and through the winding of relay DB to battery.

In actuating its contacts, relay DB opens the energizing circuit of relay HT at the break contacts of DB1, applies ground potential over an alternate path to the trunk finder wiper TWF4 and the conductor 1H leading to the trunk circuit at the make contacts of DB1, provides alternate paths at contacts DB2 and DB3 for maintaining the loop circuit complete, opens another point in the previously-traced energizing circuit of relay TS at contacts DB4, opens the pulse-start circuit at contacts DB5 and at the make-before-break contacts of DB6 provides a second alternate path for holding relay TS operated.

At the end of the inquiry call, and assuming that subscriber S32 desires to return to the established connection, when called subscriber S62 replaces his receiver as requested and previously mentioned, relay CD in the connector restores to thereby open the previously described circuit to relay DB in the inquiry and transfer circuit.

In restoring, relay DB removes the holding ground from the 1H conductor leading to the trunk circuit at the make contacts of DB1, opens the loop circuit at contacts DB2 and DB3, performs no useful function at contacts DB4 and DB5 and at the opening of the make-before-break contacts of DB6 opens the circuit to release relay TS. The removal of the ground potential from the 1H conductor leading to the trunk circuit opens the holding circuit of relay TR as previously mentioned, whereby relay TR will restore.

In restoring, relay TS opens the circuit to the connector-finder CFM and to relay HS at the contacts TS1, TS2 and TS3, respectively, opens the circuit of relay FT at the opening of the make-before-break contacts of TS4, restores ground from the contacts of the all-connector-busy relay (not shown) to the 1TS1 conductor leading to the trunk circuit, performs no useful function at contacts TS6 and at the opening of the make-before-break contacts of TS7, completes a homing circuit for the trunk finder magnet TFM, which is effective upon the closing of the break contacts at FT1 when relay FT restores. Trunk-finder magnet TFM thereupon restores its wipers TFW1 through TFW5 inclusive, to their normal positions, which in this case is the first bank contact outlet accessible by each of these wipers.

As previously mentioned, subscriber S32 may now continue conversation with the called subscriber served by the central office, or may initiate another inquiry call in the same manner as previously described, with the equipment being restored to normal in a well-known manner at the end of conversation. The circuits are now in condition to handle future calls.

Before continuing to the next section of the operational description, it is thought best to describe the function of the TSW and EB relays in the inquiry and transfer circuit. These relays are only provided and used when a second identical inquiry and transfer circuit is included in the system. Otherwise, if only one inquiry and transfer circuit were used, these relays would be omitted and the multiple connection of conductors, such as the 1TS conductor from the disclosed trunk circuit, would be extended to the TS relay over a circuit omitting the break contacts of TSW1 and contacts EB2. Therefore, it is assumed that the present system will use two inquiry and transfer circuits, it will be seen that as the first, or disclosed, inquiry and transfer circuit is taken into use as previously described, and the relay HT has operated also as previously described, a circuit is completed at the make-before-break contacts of HT3 for operating relay TSW. This circuit for operating relay TSW may be traced as extending from ground at the make contacts of HS2, contacts TS1, the make-before-break contacts of HT3 and through the upper winding of relay TSW to battery.

In actuating its contacts, relay TSW prepares a future energizing circuit to the relay such as TS in the second inquiry and transfer circuit by way of its make contacts at TSW1, opens a point at the break contacts of TSW1 in the previously-traced energizing circuit to the TS relay in the first inquiry and transfer circuit and at contacts TSW2 prepares a point in the energizing circuit to relay EB.

It is assumed that the first inquiry and transfer circuit is being used for an inquiry call as first described and it is further assumed that the second inquiry and transfer circuit will subsequently be taken into use by another subscriber who is in the process of initiating a second inquiry or transfer call. At the time that the second inquiry and transfer circuit is taken into use, it will be noted that the ground potential applied to the conductor similar to the 1TS conductor is effective for operating the TS relay in the second inquiry and transfer circuit and that when the relay in the second inquiry and transfer circuit such as HT operates, an obvious circuit is then completed for operating the disclosed EB relay.

In operating, the EB relay thereupon opens both energizing circuits to both TS relays in the first and second inquiry and transfer circuits to prevent other attempts at using these circuits until they become idle.

*Transfer call by local subscriber during an outgoing trunk call by the local subscriber*

Before starting the operational description of the above-entitled type of call, reference will first be had with the drawings referred to in the section entitled "Inquiry call by local subscriber during an outgoing trunk call by the local subscriber."

In order to describe the above-entitled transfer call, it will first be assumed that the local P.A.B.X subscriber station such as S32 in the first group of subscriber lines has originated an outgoing trunk call to a first-called subscriber located in an exchange, not shown, but served by the central office, all of which has been described in the previous section entitled "Outgoing trunk call from local subscriber to central office." It will next be assumed that during the course of the outgoing trunk call, the calling local P.A.B.X subscriber S32 has initiated an inquiry call to the local P.A.B.X subscriber S62, all of which has been described in the previous section entitled "Inquiry call by local subscriber during an outgoing trunk call by the local subscriber."

It will be repeated that in order to describe the above-mentioned transfer call, it will be assumed as stated above, that the calling local P.A.B.X subscriber S32 has placed an outgoing trunk call to the previously mentioned first-called subscriber in the exchange served by the central office and that subscriber S32 has thereafter placed an inquiry call with the local P.A.B.X subscriber S62, with this inquiry call being completed and conversation taking place between subscriber S32 and subscriber S62.

At this stage of the operational description, and in order to begin the description of the above-mentioned transfer call, it will be assumed that subscriber S32 does not desire to return to the previous connection with the first-called subscriber and it is further assumed that subscriber S62 will accept transfer of the outgoing trunk call with this first-called subscriber. It is still further assumed that all operations have taken place in the associated circuits in the same manner as earlier described in the section entitled "Inquiry call by local subscriber during an outgoing trunk call by the local subscriber" up to the point in the description where a local subscriber S32 is about to replace his receiver and local subscriber S62 will remain in the connection. It will be appreciated that in order for subscriber S62 to accept the trunk call with the first-called subscriber, he must dial the digit "2," subsequent to subscriber S32 replacing his receiver, for causing the proper accepting operations in order to extend a talking connection with the first-called subscriber in the exchange served by the central office.

Referring in particular to the connector shown in Figs. 3 and 4, it will be noted that line relay A is held operated over the loop circuit by means of talking conductors −L and +L, which are extended through the inquiry and transfer circuit as 1— and 1+, respectively, into the trunk circuit and through the trunk circuit to the line circuit of subscriber S32. At the time that subscriber S32 replaces his receiver, the above-mentioned loop circuit to the line relay A in the connector is opened and line relay A will restore with no particular effect on the connector circuit or the other circuits for the time being. For reasons to be pointed out later in this section, it will be appreciated that subscriber S62 will be assumed to be a non-restricted subscriber similar to subscriber S32.

When subscriber S62 dials the digit "2," the loop circuit extending from his line circuit is interrupted responsive to dialing in a well-known manner, with relay E of the connector responding thereto. Relay E restores responsive to the first break of the dial impulse springs, whereby a circuit is completed at contacts E1 for operating relay C. The other contacts controlled by the restoration of relay E perform no useful function at this time. The circuit for operating relay C may be traced as extending from ground at the make contacts of CD6 contacts E1 and through the lower winding of relay C to battery.

In actuating its contacts, relay C prepares a point in the operating circuit of relay K at contacts C4 and performs no useful function at the remainder of its contacts for the present. Relay E reoperates responsive to the closing of the dial impulse springs subsequent to the above-mentioned first break and completes a circuit for operating relay K over an obvious path from ground at contacts E5 and opens the circuit of relay C by opening contacts E1.

In actuating its contacts, relay K opens contacts K1 with no effect on the circuits during the present, prepares a point at the make contacts of K2 for extending a marking ground potential to mark both the level and the bank contact outlet corresponding to the line of subscriber S62 in the trunk circuit, completes its locking circuit at contacts K3, completes a circuit for operating the transfer accept (TA) relay (not shown) at contacts K4, completes a circuit at contacts K5 for operating relay TB in the inquiry and transfer circuit and prepares a point in the release circuit of relay H at contacts K6.

Referring to the inquiry and transfer circuit disclosed in Figs. 5 and 6, it will be noted that at the time that the transfer accept (TA) relay (not shown) operated in response to the closing of contacts K4, contacts were operated by the transfer accept relay to extend ground back over a circuit including contacts J4 and K5 of the connector, conductor RL to the bank contact engaged by wiper connector finder wiper CFW3, the contacts such as TB1 controlled by a relay such as TB of the second inquiry and transfer circuit and through the winding of the TB relay in the instant inquiry and transfer circuit to battery. After a reasonable length of time, relay TB operates to open the contacts such as TB1 in the second inquiry and transfer circuit to prevent the operation of the relay such as TB in the second inquiry and transfer circuit so that only one transfer accept call can be connected at one time, opens contacts TB2 to disconnect the ground potential from the 1RL conductor leading to the trunk circuit, opens the break contacts of TB3 to open the previously described circuit to the relay DB, closes the make contacts of TB3 to connect the ground potential to the RL conductor from the connector circuit to maintain relay DB operated and at contacts TB4 extends ground from a contact operated by the transfer accept relay (not shown) for marking the line of subscriber S62 on the trunk circuit vertical bank and on the contact outlet in the EC bank of the trunk circuit. This marking is applied to the vertical bank and the contact of the EC bank in the same manner as described in the section entitled "Outgoing trunk call from local subscriber to central office." This circuit may be traced as extending from the above-mentioned grounded transfer accept relay contact and conductor, contacts TB4, HS5, connector-finder wiper CFW6 and engaged bank contact, the conductor MK leading to the connector, the make contacts of K2, the EC connector wiper CW4 and engaged bank contact, the EC conductor leading to the line circuit of subscriber S62 and by means of the previously described multiple connection to the trunk circuit to mark the vertical bank and the contact in the EC bank accessible by the trunk circuit EC wiper TCW4.

It will be appreciated that relay TB is constructed as being slow-to-operate, as mentioned above, and that before relay TB has operated to open its contacts TB2, the previously-traced ground potential by way of the RL conductor from the connector is extended through the inquiry and transfer circuit to the trunk circuit over the 1RL conductor by means of the trunk finder wiper TFW3 and engaged bank contact.

The above-mentioned ground on the 1RL conductor is sufficient for shunting the holding circuit of the SW relay in the trunk circuit to cause this relay to restore.

It will further be noted that the application of the ground potential to the 1RL conductor leading to the trunk circuit from the inquiry and transfer circuit also energizes the release magnet 2RLM by way of the vertical off-normal contacts VON/T2 and VON/T4, whereby the trunk circuit wipers TCW1 through TCW4 are restored to normal in a well-known manner. It will be seen that the ground potential applied as previously described to the 1H conductor is effective for maintaining the release magnet 2RLM operated by way of contacts TR10, the make contacts of TRA3, the make contacts of the release magnet interrupter springs 2RLM/INT, the closed vertical off-normal contacts VON/T4 and VON/T2 and through the winding of the release magnet 2RLM to the release alarm battery (not shown). Therefore, at the time that the interrupter contacts of the release magnet 2RLM/INT restore to normal and at the time that the switching relay SW restores its contacts SW6, an obvious circuit from the grounded 1H conductor is completed for operating relay DR over its left-hand winding. Relay DR thereupon operates to complete a previously described circuit to the vertical magent 2VM, with the interaction of vertical magnet 2VM and relay DR taking place as previously described to raise the trunk circuit wipers until the vertical trunk wiper VTW engages the marked vertical level.

The trunk circuit thereafter operates in the same manner as described in the section entitled "Outgoing trunk call from local subscriber to central office," wherein the wipers are first stepped to the marked vertical level as just described and they are then subsequently stepped to the marked bank outlet in the vertical level and the switching relay SW operates in response thereto as previously described. At the time that switching relay SW operates its make-before-break contacts of SW10, a circuit is completed for operating relay H in the connector. This circuit may be traced as extending from the previously described grounded bank contact engaged by the trunk circuit EC, wiper TCW4, the make-before-break contact of SW10, the negative trunk circuit wiper TCW1 and engaged bank contact, over conductors in the well-known multiple connection (not shown) to the bank contact engaged by the negative connector wiper CW1, contacts K6 and to the right-hand winding of relay H. Ground is also present on the right-hand winding of relay H from the opposite direction and may be traced as extending from the make contacts of B2 and the "X" contacts of H3 to the right-hand winding.

Upon restoring, relay H releases contacts H5, H6, and H7 whereby the ring cut-off relay CD restores to cause the subsequent release of relays E, J and K all in the same manner as previously described. The release of relay E opens a previously-traced holding circuit for relay B by way of the rectifier RE1, whereby relay B restores to remove the busying ground applied to the C conductor leading from the connector and extending through the inquiry and transfer circuit to the 1H conductor leading to the trunk circuit. The restoring of relay K opens the previously described operating circuit to the transfer accept relay (not shown) and also opens the circuit to remove the application of ground by means of a contact of the transfer relay, whereby the RL conductor leading to the inquiry and transfer circuit is no longer grounded and relays TB and DB both will subsequently restore to cause the release of the inquiry and transfer circuit.

The removal of the ground from the 1H conductor leading to the trunk circuit opens the holding circuit to the relay TR, which is constructed as being slow-to-release and upon restoring after a reasonable length of time opens the circuit to allow relay TRA to restore. The restoring of relay TR extends the talking conductors from the line circuit of subscriber S62 through the trunk circuit to the central office at the break-after-make contacts of TR5 and TR11, while the restoring of relay TRA opens the previously described alternate holding circuit from the windings of line relay AT.

At this time it will be seen that subscriber S62 is now connected to the first called party in the exchange served by the central office and previously called by subscriber S32. Conversation may now proceed, and if so desired, subscriber S62 may initiate and complete other inquiry or transfer calls, all in the same manner as just described.

At the end of conversation, the equipment is restored to normal in the same manner as previously described and is thereafter conditioned to handle future calls.

*Incoming trunk call to local P.A.B.X subscriber from calling subscriber in exchange served by central office*

Before starting the operational description of the above-mentioned type of call, reference will first be had with the trunking diagram comprising Figs. 11 and 12. In order to describe the above-mentioned call, it will be assumed that a calling subscriber located in an exchange, not shown, but served by the central office, desires to call a local subscriber such as S32 in the first group of subscriber lines. Therefore, from the trunking diagram, it will be noted that particular reference will hereafter be had with Figs. 1, 7, 8, 9, and 10 and that these drawings should be arranged as shown in the trunking diagram. It is pointed out that the line circuit of subscriber S32 of Fig. 1 is used, while the trunk circuit comprising Figs. 7, 8, 9, and 10 should be arranged as described in the section entitled "Outgoing trunk call from local subscriber to central office."

Reference will first be had with the trunk circuit comprising the Figs. 7, 8, 9, and 10. Responsive to the calling subscriber in the exchange served by the central office initiating an incoming trunk call, it will be noted that as soon as the central office line is seized, relay LR in the trunk circuit operates from the battery and ground applied to the A and B line conductors leading from the central office in any well-known manner.

In actuating its contacts, relay LR applies ground at contacts LR1 to busy the disclosed trunk circuit to the trunk allotter and at contacts LR2 completes an obvious circuit for operating relay DR over its right-hand winding.

In actuating its contacts, relay DR removes an obvious ground from the conductor leading to the all-trunks-busy relay (not shown) at contacts DR1, performs no useful function for the time being at contacts DR2, completes a circuit at contacts DR3 for lighting the trunk supervisory, or busy, lamp in the attendant's cabinet and performs no useful function for the time being at contacts DR4.

It will be appreciated that, as stated before, the attendant's cabinet is assumed to be of any well-known type suitable for use in the present system and is therefore not shown in detail but only in the block diagram in Fig. 12. The circuit for lighting the trunk busy lamp at the attendant's cabinet may be traced as extending from ground at the break contacts of AC1, contacts DR3, the break contacts of CR2, the break contacts of BT3, the break contacts of SW7, the break contacts of TRA7, the conductor LS and associated cable leading to the attendant's cabinet and through the trunk busy lamp thereat to battery.

Line relay AC operates responsive to ringing current being applied from the calling exchange in a well-known manner to the line conductors A and B. In actuating its contacts, line relay AC opens the previously described trunk busy lamp circuit at the break contacts of AC1, extends ground at the make contacts of AC1 to light the trunk call lamp in the attendant's cabinet, completes a circuit at contacts AC2 for operating a buzzer in the attendant's cabinet and at contacts AC3 completes a holding circuit for itself from the ringing current return ground on the A line conductor from the distance office. The circuit for operating the trunk call lamp may be traced as extending from the make contacts of AC1, the break contacts of PS6, conductor LA and associated cable leading to the attendant's cabinet and through the trunk call lamp to battery. The circuit for operating the buzzer at the attendant's cabinet may be traced as extending from ground at contacts AC2, conductor BZ and associated cable leading to the attendant's cabinet and through the buzzer thereat to battery. The holding circuit for the relay AC may be traced as extending from the ring return ground on the A line conductor from the distant office, contacts CR7, the winding of relay AC, contacts AC3, DR2 and through resistance R10 to battery.

Responsive to observing the burning of the trunk call lamp, the operator answers the incoming call by operating the appropriate trunk connect, or answer key, which extends ground from the attendant's cabinet by way of the cable and associated conductor TC1 for operating relay TC in the trunk circuit.

In actuating its contacts, relay TC closes its "X" contacts TC1 to complete its holding circuit by way of the H conductor and the associated cable to a ground applied thereon in the attendant's cabinet, performs no useful function for the time being at contacts TC2, TC3, TC4, TC5, TC6, and TC8, opens a point in a chain circuit at the break contacts of TC7 to disconnect ground from all of the other trunk connect keys, while the closing of the make contacts of TC7 extends ground over conductor TC3 and associated cable from the attendant's cabinet back to the attendant's cabinet by way of conductor TL and associated cable to light the common trunk release lamp thereat and at contacts TC9 and the make-before-break contacts of TC10 extends the attendant's telephone loop conductors into the trunk circuit to operate line relay AT in a well-known manner.

In actuating its contacts, line relay AT completes a circuit at the make contacts of AT1 for operating relay BT and at the make-before-break contacts of AT2 connects the winding of relay LA into the central office loop circuit whereby the ringing is tripped at the central office in a well-known manner and relay LA will operate. In operating, relay LA completes an obvious circuit by way of ground, the break contacts of CS7 and contacts LA1 for operating relay CR over its left-hand winding.

In actuating its contacts, relay BT performs no useful function for the time being at the make contacts of BT1, opens a further point in the circuit to the all-trunks-busy relay (not shown) at the break contacts of BT2, performs no useful function for the time being at the make contacts of BT2, completes a circuit at the make contacts of BT3 for flashing the trunk busy lamp in the attendant's cabinet, applies ground at contacts BT4 to the AL1 conductor leading to the trunk allotter for guarding the trunk circuit against seizure and performs no useful function for the time being at contacts BT5.

In actuating its contacts, relay CR opens a point to the release magnet circuit at contacts CR1, performs no useful function for the time being at contacts CR2, CR3, CR4, and CR5, opens contacts CR6 and CR7 to release relays AC and LR, completes a circuit at the make contacts of CR8 for operating the release relay (not shown) and completes the motor start (not shown) circuit at contacts CR9 in a well-known manner.

Relays AC and LR restore as described above and responsive to the release of relay LR, relay DR also releases the talking connection between the calling subscriber and the attendant is now completed, with it being assumed as stated before that the calling distant subscriber desires to call the local subscriber S32. It will be pointed out at this time that the operator can now extend the call to the line of local subscriber S32 by means of key sender equipment (if equipped) or by dialling the required number. In either case, it will further be remembered that the operator must first operate her extend key without restoring the answer key, at which time relay CE in the trunk circuit is operated when the extend key is operated and ground is forwarded from the attendant's cabinet over conductor CE and associated cable to the trunk circuit, contacts TC4 and through the winding of relay CE to battery.

In actuating its contacts, relay CE opens contacts CE1 and closes the make-before-break contacts of CE5 to disconnect the talking connection of the calling party with the operator and at the same time places the holding circuit including resistance R8 across the A and B line conductors leading to the central office to hold the connection thereat and in addition, cause the release of relay LA, the closing of the make contacts of CE2 prepares a point in the pulsing circuit to the vertical and rotary magnets 2VM and 2RM, the vertical trunk wiper VTW is disconnected from the trunk circuit at the break contacts of CE3, an obvious operating circuit is completed for relay CT from ground at the make contacts of AT1 by way of contacts CE4, a point in the energizing circuit of relay CS is opened at contacts CE6, the make contacts of CE7 performs no useful function for the time being, switching relay SW is disconnected from the EC wiper TCW4 at the break contacts of CE8, contacts CE9 perform no useful function for the time being and contacts CE10 complete a locking circuit for relay CE to the previously described grounded H conductor.

In actuating its contacts, relay CT prepares a point in the vertical pulsing circuit to vertical magnet 2VM and also a point in the pulse holding circuit to itself at the make contacts of CT1, maintains a circuit for holding relay CR operated at the make contacts of CT2 and performs no useful function at contacts CT3 and CT4.

At this stage of the operational description, in order to further extend the desired connection, the operator may operate her dial or key-sender in a well-known manner for causing line relay AT in the trunk circuit to respond to the impulses of the dialled or keyed digits. Since it has previously been mentioned that the desired local party is subscriber S32, the two-digit number "32" is assumed to be the call number of subscriber S32 and line relay AT will respond to impulses representing the first digit "3" by restoring and reoperating a total of three times each. Vertical magnet 2VM will therefore operate over a circuit traced from ground at the break contacts of AT1, the make contacts of BT1, the break contacts of PS7, the make contacts of CE2, the make contacts of CT1, and through the winding of the vertical magnet 2VM to battery. This ground pulse from the break contacts of AT1 is also sufficient over the same circuit for maintaining relay CT operated by means of its upper winding. In this manner, the trunk circuit wipers TCW1 through TCW4 inclusive, are stepped to the third vertical level. It will be noted, as previously described in the earlier sections, that responsive to the first operation of the vertical magnet 2VM, the vertical off-normal springs VON/T1 through VON/T4 inclusive, are operated. Therefore, the opening of the vertical off-normal contacts VON/T1 opens a previously-traced operating circuit to relay CT, contacts VON/T2 prepares a point in the circuit to the release magnet 2RLM, contacts VON/T3 provides a working ground for use in various parts of the trunk circuit and contacts VON/T4 prepares an alternate path in the circuit to the release magnet 2RLM. At the end of the first train of impulses representing the first digit, the circuit is opened to relay CT and it will restore after a reasonable length of time before the beginning of the second train of impulses.

The release of relay CT prepares the rotary pulsing circuit to the rotary magnet 2RM at the break contacts of CT1, opens the circuit to relay CR by opening the make contacts of CT2, performs no useful function at contacts CT3 and at contacts CT4 opens an ineffective resistive shunt of the winding of relay LA. The rotary stepping circuit may be traced as extending from ground at the break contacts of AT1 (when relay AT releases), the make contacts of BT1, the break contacts of PS7, the make contacts of CE2, the break contacts of CT1, contacts GT1, KT2, the winding of relay ET and through the winding of rotary magnet 2RM to battery.

Responsive to the dialling, or keying, of the second digit of the called number of subscriber S32, which in this case is assumed to be the digit "2," line relay AT will restore and reoperate a total of two times each. Therefore, the above-traced rotary pulsing circuit is completed responsive to the restoration of line relay AT on the first pulse and relay ET will operate in series with rotary magnet 2RM. Relay ET will remain operated during the rotary pulsing and open the circuit to relay DR from the EC wiper TCW4 at contacts ET1, prepares a point in the busy test circuit by way of the control wiper TCW3 at the make contacts of ET2 and prepares an alternate point in the rotary pulsing circuit at contacts ET3.

The trunk circuit wipers TCW1 through TCW4 are advanced across the selected third level in a well-known manner and at the end of the rotary pulsing it will be noted that the trunk circuit wipers will be engaged with the second bank contacts in the third level. Since line relay AT is operated at the end of pulsing, the circuit to relay ET is opened and since it is constructed as being slow-to-release, it will therefore release slowly, during which time busy test relay GT will test for the busy or idle condition of the called line by means of the control or C conductor.

If, for the sake of illustration, it is assumed that subscriber S32 is busy, control wiper TCW3 will encounter busying ground in a well-known manner, which completes a circuit for operating busy test relay GT. This circuit may be traced as extending from the ground engaged by control wiper TCW3, the break-after-make contacts of SW5, the break-after-make contacts of KT4, the make contacts of ET2, and through the lower winding of relay GT to battery.

In actuating its contacts, relay GT completes its locking circuit at contacts GT4, opens a point in the rotary pulsing circuit at contacts GT1, extends 60 IPM ground pulses at the make contacts of GT6 for flashing the trunk busy lamp in the attendant's cabinet and performs no useful function for the present at the remainder of its contacts. It is assumed that the series relay ET will restore at the time that busy test relay GT completes its own locking circuit. The locking circuit for relay GT may be traced as extending from ground at vertical off-normal contacts VON/T3, the break contacts of SW2, the break contacts of KT3, contacts GT4, the upper winding of relay GT and through the resistance R12 to battery. The circuit for flashing the trunk busy lamp at 60 IPM may be traced as extending from the 60 IPM conductor, the break contacts of the cam springs CAM/TS1, the make contacts of GT6, the make contacts of BT3, the break contacts of SW7, the break contacts of TRA7, conductor LS and associated cable to the busy lamp at the attendant's cabinet and battery. It will also be noted at this time that the restoring of relay ET will open the rotary pulsing circuit at contacts ET3.

The 60 IPM flashing of the trunk busy lamp is an indication to the operator at the attendant's cabinet that called subscriber S32 is busy. If the calling subscriber decides to wait on the busy connection, the operator must first operate the trunk release key to restore relays TC and CE in the trunk circuit and thereafter reoperate the individual trunk call key to reconnect the operator to the incoming trunk line whereby the calling party may be advised that the called line is busy. The calling party may hang up to restore the equipment in a well-known manner, or he may inform the operator that he will camp-on the connection until the local line is clear. In case of the latter, the trunk release key is operated to disengage the operator from the connection so that other calls may be handled. The trunk busy lamp will now flash at 60 IPM to ground as an indication that the called line is busy. However, when the called line is free, the trunk busy will flash at 120 IPM and will burn steadily when the called party answers the call. The attendant thereby has visual indication of each stage of the connection and can enter the connection at any time to supervise or monitor the call as the case may be.

For the present description it will be assumed that subscriber S32 is not busy and therefore relay GT will not operate since there is no busying ground encountered by the control wiper TCW3. After a reasonable length of time, relay ET will restore as previously described, whereby a circuit is completed for operating relay KT at the break contacts of ET2. This circuit may be traced as extending from ground at the operated vertical off-normal contacts VON/T3, the break contacts of SW2, the break-before-make contacts of KT4, the right-hand winding of relay KT, the break contacts of ET2, the break-after-make contacts of KT4, the break-after-make contacts of SW5, the control wiper TCW3 and engaged bank contact, over the conductor extending therefrom to the local line circuit of subscriber S32 disclosed in Fig. 1 and through the middle winding of the line relay such as L. It will be noted that relay KT of the trunk circuit and the line relay L in the local line circuit of subscriber S32 will operate in series.

In actuating its contacts, relay KT closes its "X" contacts KT1 to complete its own locking circuit. It opens another point in the rotary pulsing circuit at contacts KT2, connects ground to the motor start conductor at the make contacts of KT3, applies ground potential at the make-before-break contacts of KT4 for busy guarding the connection over the control conductor and also for holding relay L operated in the local line circuit, opens a point in an operating circuit of relay DR at contacts KT5, completes the ringing current and return ground circuit to the line of subscriber S32 at contacts KT6 and KT7 by way of relay FT for ringing over the local line, provides ringback tone to the calling party by way of contacts KT8, and performs no useful function for the time being at contacts KT9 and KT10. The holding circuit for relay KT may be traced as extending from ground at the closed vertical off-normal contacts VON/T3, the break contacts of SW2, "X" contacts KT1, the left-hand winding of relay KT and through resistance R12 to battery. This same ground is extended from the break contacts of SW2, the make contacts of KT3, the break contacts of KT3, the break contacts of FT3, and out over the motor start conductor to battery. This same ground is further extended from the break contacts of SW2, the make-before-break contacts of KT4, the break-after-make contacts of SW5, and out over the control wiper TCW3 and associated control conductor for the busy guarding purpose and for holding the line relay L of the called subscriber operated as previously mentioned.

When called subscriber S32 answers after a reasonable length of time, the telephone loop is returned over the line conductors of the connection for operating ring cut-off relay FT in a well-known manner.

In actuating its contacts, relay FT closes its "X" contacts FT1 to provide its own holding circuit, opens a point in the trunk holding circuit that is applied to the line relay AT at contacts FT2, opens the motor start circuit at the break contacts of FT3, prepares a point in the circuit for relay Z at the make contacts of FT3, extends the answering loop to relay AT at the make contacts FT4 and FT5, disconnects the ringing current at the break contacts of FT4 and FT5, removes the flashing ground from the trunk busy lamp at the break contacts of FT6, provides steady ground at the make contacts of FT6 for maintaining the steady burning of trunk busy lamp, and prepares a point in the timing circuit at contacts FT7.

The operator can now speak with the called party S32, with this conversation being secret from the calling party. In order to extend the connection from the calling party to the called party, the operator must operate the trunk release key, which thereupon removes ground from the H conductor leading to the trunk circuit to cause the release of relays TC and CE.

It will be noted that the restoring of relay TC removes the operator's telephone from the connection at contacts TC9 and the break-before-make contacts of TC10. The restoring of relay CE removes the holding circuit placed on the calling line at contacts CE1 and the make-before-break contacts of CE5, whereby the calling party is now connected to the called party by means of the transmission bridge. Relay LA operates over the calling party's loop and completes a previously described circuit to relay CR at contacts LA1, with relay CR operating also as previously described.

In actuating its contacts, relay CR completes a circuit for operating relay Z at contacts CR4, disconnects relays AC and LR from the line extending from the central office at contacts CR6 and CR7, completes a circuit at the make contacts of CR8 to the release relay (not shown) and performs no useful function during the present at its other contacts. The circuit for operating relay Z may be traced from ground at the vertical off-normal contacts VON/T3, the break contacts of SW2, the make contacts of AT3, the make contacts of FT3, contacts TR6, rectifier 1RE2, the upper winding of relay Z, contacts CR4, the break contacts of SR4, contacts TRA5, CS6, KT9, the lower winding of relay Z and through resistance R14 to battery.

In actuating its contacts, relay Z opens the pulse-start circuit, completes an obvious circuit for operating relay PS at the make contacts of Z4 and performs no useful function at the remainder of its contacts.

In actuating its contacts, relay PS completes its own obvious holding circuit to the grounded vertical off-normal contacts VON/T3 at contacts PS1, short-circuits the line relay contacts of AT2 at contacts PS2, opens the motor-start conductor at contacts PS5 and performs no useful function at the remainder of its contacts.

The calling party is now connected with the called local subscriber S32 and conversation may proceed in the usual manner. The operator at the attendant's cabinet may monitor this call merely by reoperating the trunk call key which will place her telephone loop circuit across the engaged trunk line.

At the end of conversation and responsive to the calling party disconnecting first, the removal of ground on the A line conductor leading from the central office will release relay LA, which upon restoring opens the circuit to relay CR at contacts LA1. Upon restoring, relay CR completes an obvious circuit for operating relay CS at the break contacts of CR8. This circuit for operating relay CS may be traced as extending from ground at the make contacts of BT2, the break contacts of CR8, contacts CE6 and through the winding of relay CS to battery.

In actuating its contacts, relay CS opens a point in the previously described short-circuit of the make-before-break contacts of AT2 at contacts CS1, performs no useful function for the time being at contacts CS2, completes a holding circuit for itself at contacts CS3 to the grounded vertical off-normal contacts VON/T3, connects relay CR to the A line conductor at contacts CS4, extends ground at the make-before-break contacts of CS5 over the B line conductor to the central office, opens a point in the circuit to release relay Z at contacts CS6, maintains a trunk busying ground on the AL1 conductor leading to the trunk allotter at the make contacts of CS7, provides an obvious alternate holding circuit for relay PS at contacts CS8, performs no useful function during the present at contacts CS9 and at contacts CS10 applies ground to the motor start conductor. At the time that the make-before-break contacts of CS5 were closed, as described above, ground was extended by way of the lower left-hand winding of the repeating coil, the winding of relay LA, the upper left-hand winding of the repeating coil, the make-before-break contacts of AT2, the break-after-make contacts of CE5 and out over the B line conductor to seize the line equipment in the central office. Responsive to the seizure of this line equipment in the central office, ground is applied thereat in a well-known manner to the A line conductor leading to the trunk circuit over contacts CE1, CS4 and the right-hand winding of relay CR to battery.

In actuating its contacts, relay CR opens a point in the release magnet circuit at contacts CR1, performs no useful function for the time being at contacts CR2, completes the previously described time delay circuit at contacts CR3 and CR4, completes an obvious alternate locking circuit for relay PS at contacts CR5, disconnects relays AC and LR from the line conductors leading to the central office at contacts CR6 and CR7, completes an obvious circuit for applying ground to the release relay (not shown) and performs no useful function for the time being at contacts CR9.

When the called party hangs up, line relay AT releases and at the break-after-make contacts of AT2 opens the previously traced circuit for restoring the line equipment at the central office, whereby ground is removed from the A line conductor to release relay CR. The opening of the make contacts of AT1 opens the previously described circuit to relay BT, whereby this relay restores after a reasonable length of time to complete the circuit to the release magnet 2RLM. This circuit to the release magnet 2RLM may be traced as extending from ground at the break contacts of AT1, the break contacts of BT1, contacts CR1, vertical off-normal contacts VON/T2 and through the winding of release magnet 2RLM to the battery at the release alarm. It will be noted that ground from the vertical off-normal contacts VON/T3 holds relay CS operated for maintaining the busy condition of the trunk circuit over the AL1 conductor until the trunk circuit is restored. Upon restoring of the trunk circuit, all of the vertical off-normal contacts are restored to normal and relay CS thereafter restores. The restoring of relay CS also opens previously described circuits to relays CR and PS which also subsequently restore. It will be noted that the opening of the vertical off-normal contacts VON/T3 also opens holding circuits to relays GT, KT and FT, whereby these relays also restore.

The equipment is now at normal and conditioned to handle future calls.

In the event that the called subscriber S32 hangs up first, line relay AT will restore, as previously described, and at the break contacts of AT1 completes a circuit for operating relay DF, while the restoring of the contacts of AT2 to normal short-circuits relay LA to cause this relay to restore. The circuit for operating relay DF may be traced as extending from ground at the break contacts of AT1, the make contacts of BT1, the make contacts of PS7, the break contacts of SR8 and through the upper winding of relay DF to battery. It will also be noted that the restoring of relay LA opens the circuit for releasing relay CR at contacts LA1.

In actuating its contacts, relay DF performs no useful function for the present at contacts DF1, DF2, DF3, DF4, and DF7, while the closing of "X" contacts DF5 completes its own obvious locking circuit and a circuit is completed for maintaining relay BT operated at the make contacts of DF6. This circuit for maintaining relay BT operated may be traced as extending from ground at the vertical off-normal contacts VON/T3, the make contacts of SW2, contacts CS2, the make contacts of DF6 and through the winding of relay BT to battery. This above-traced holding circuit for relay BT prevents relay BT from restoring at the time that line relay AT restores when the called party hangs up. The release of relay CR, as mentioned above, completes a circuit at the break contacts of CR8 for operating relay CS.

In actuating its contacts, relay CS completely removes the left-hand repeating coil windings and relay LA from the calling loop at the contacts CS1 and the make-before-break contact of CS5, opens the holding circuit to relay BT at contacts CS2, completes its own obvious holding circuit at contacts CS3, completes a circuit for operating relay CR to the grounded A line conductor at contacts CS4, releases relay Z at contacts CS6, maintains a busy guarding ground potential on the AL1 conductor leading to the trunk allotter at the make contacts of CS7, provides an alternate holding circuit for relay PS at contacts CS8, performs no useful function for the time being at contacts CS9 and applies ground to the motor start conductor at contacts CS10.

Relay CR holds operated as previously mentioned until the calling party hangs up, at which time ground is removed from the A line conductor and relay CR restores. On the release of relay CR, the closing of contacts CR1 completes a previously described circuit for operating release magnet 2RLM, whereby the trunk circuit is restored to normal in the same manner as previously described and all of the operated relays restore.

The equipment is now at normal and conditioned to handle future calls.

It will be noted that means is provided whereby if either of the two parties in an established connection fail to hang up on completion of either an incoming or out-going call, the previously described time-delay circuit functions to flash the answer lamp at the attendant's cabinet at the rate of 120 r.p.m. to signal the operator of the trouble. The operator at the attendant's cabinet thereafter operates the appropriate trunk call key to enter the particular connection and deal with the trouble as required. The trunk circuit is thereafter caused to restore and free the line for future use, at which time the operator disconnects from the circuit. If the trouble is due to some misoperation by the central office party, the operator operates the local disconnect key to release the trunk circuit. When the operator disconnects from the trunk circuit, relay LR will reoperate to the battery and ground potential over the line conductors from the central office and cause relay DR to operate over an obvious circuit, whereby the closing of contacts DR3 maintains a visual signal operated in the attendant's cabinet over a previously traced circuit including conductor LS leading from the trunk circuit to the attendant's cabinet.

Before continuing to the next section of the operational description, reference will be made for the present to the portion of this section wherein the called subscriber S32 was signalled and found busy. If it is determined by the operator that the incoming trunk call is of sufficient importance, the operator depresses a tone key at her position which applies a tick-tone to a busy line in a well known manner and both engaged parties will hear the signal. This tick-tone is applied to the conductor RW leading from the attendant's cabinet to the trunk circuit and extends over contacts TC5, GT7, the positive wiper TCW2 and engaged bank contact and over the positive line conductor to the busy connection, whereby both parties will hear this tone. This tone serves as an indication that both parties should end their conversation as soon as possible and replace their receivers, whereby called subscriber S32 is automatically signalled in a well-known manner and the call progresses in the same manner as previously described.

*Outgoing trunk call by the operator at the attendant's cabinet*

Before starting the operational description of the above-mentioned type of call, reference will first be had with the trunking diagram comprising Figs. 11 and 12. In order to describe the above-mentioned call, it will be assumed that the operator at the attendant's cabinet desires to call a subscriber located in an exchange (not shown) but served by the central office and may subsequently extend the call to a local subscriber such as S32. Therefore, particular reference will hereafter be had with Figs. 1, 7, 8, 9, and 10, with these drawings being arranged as shown in the trunking diagram.

Referring in particular to the trunk circuit comprising Figs. 7, 8, 9, and 10, which is assumed to be idle, in order for the operator to initiate an outgoing trunk call the operator must operate the trunk call key individual to the trunk circuit. The operation of this trunk call key completes a circuit over the conductor such as TC1 for operating relay TC in the trunk circuit over its right-hand winding.

In actuating its contacts, relay TC extends the operator's telephone loop into the trunk circuit by way of conductors AT/B and AT/A and contacts TC9 and make-before-break contacts of TC10 respectively, to operate line relay AT in the trunk circuit in a well-known manner.

In actuating its contacts, line relay AT completes a circuit for operating relay BT at the make contacts of AT1 and at the make-before-break contacts of AT2 completes a point in the pulse repeating circuit over the line leading to the central office.

In actuating its contacts, relay BT performs no useful function during the present call at the make contacts of BT1, completes a circuit at the make contacts of BT2 for operating relay CS, completes a circuit for flashing the trunk busy lamp from the 120 IPM ground impressed on the FL conductor leading from the attendant's cabinet and by way of the break contacts of FT6, the break contacts of GT6, the make contacts of BT3, the break contacts of SW7, the break contacts of TRA7, out over the LS conductor to the attendant's cabinet and through the trunk busy lamp to battery. Relay BT also applies ground potential at contacts BT4 for guarding the trunk over conductor AL1 against seizure by the trunk allotter and performs no useful function at contacts BT5. The circuit for operating relay CS may be traced as extending from ground at the make contacts of BT2, the break contacts of CR8, contact CE6 and through the winding of relay CS to battery.

In actuating its contacts, relay CS connects relay CR to the A line conductor leading to the central office at contacts CS4, extends ground at the make-before-break contacts of CS5 through the left-hand winding of the repeat coil, the winding of relay LA, the upper left-hand winding of the repeat coil, the make-before-break contacts of AT2 and out over the B line conductor to the central office to seize the equipment thereat, while the remainder of the contacts of relay CS perform no useful function during the present type of call. Responsive to seizure, ground is returned in a well-known manner from the central office over the A line conductor to operate relay CR.

In actuating its contacts, relay CR disconnects relays AC and LR from the line leading from the central office at contacts CR6 and CR7, opens the energizing circuit of relay CS at the break contacts of CR8 and performs no useful function for the time being at the remainder of its contacts.

Responsive to the above-mentioned seizure, dial tone is returned from the central office in a well-known manner and the operator dials the desired number.

Line relay AT responds to the train of impulses of each dialled digit and at the make-before-break contacts of AT2 repeats these impulses out over the line to the central office equipment. On the first release of line relay AT, the restoring of the break contacts of AT1 completes a circuit for operating relay CT. This circuit for operating relay CT may be traced as extending from ground at the break contacts of AT1, the make contacts of BT1, the break contacts of PS7, the break contacts of CE2 and through the lower winding of relay CT to battery. Relay CT holds operated during dialling and at contacts CT4 short-circuits the impedance of relay LA and the repeat coil windings to improve the transmission bridge during impulsing. Relay LA releases during the impulsing but relay CR holds from ground at the break contacts of CS7, the make contacts of CT2 and through the left-hand winding of relay CR to battery. Relay CT performs no useful function at the remainder of its contacts during this type of call.

Responsive to completion of dialling, the operator is connected through to the called party in a well-known manner. If it is desired to extend the called party to a local line such as subscriber S32, the extend key at the attendant's cabinet is operated to cause the operation of relay CE in the same manner as described in the section entitled "Incoming trunk call to local P.A.B.X subscriber from calling subscriber in exchange served by central office." The equipment in the trunk circuit is thereafter operated in the same manner as described in the above-mentioned section to extend the call to the local subscriber, with the operator performing the same operations also as previously described.

At the end of the call and responsive to the parties replacing their receivers, the equipment is restored to normal in the same manner as previously described, whereby future calls may thereafter be handled.

Having described my invention, what is considered new and is desired to have protected by Letters Patent will be pointed out in the appended claims.

What is claimed is:

1. In a telephone system, subscriber lines, finder-connector links having access to said subscriber lines, trunk lines, trunk circuits terminating said trunk lines, trunk finders individual to each of said trunk circuits, contact banks individual to each of said trunk finders and terminating connections from said subscriber lines, means for operating one of said finder-connector links to hunt for and connect with a calling one of said subscriber lines, a source of marking potential in said one finder-connector link, an allotter for allotting idle trunk circuits for use, means for directively operating said one finder-connector link under control of said calling subscriber line to extend said marking potential to said allotter and to the contacts of said contact banks representing said calling subscriber line, said allotter operated in response to receipt of said marking potential for selecting an idle one of said trunk circuits, means in said selected trunk circuit operated in response to said selection for operating said trunk finder to hunt for and connect with the said contacts of said contact bank having said marking applied thereto, means in said selected trunk circuit operated in response to said trunk finder connecting with the marked bank contact representing said calling subscriber line for extending said marking potential back to said one finder-connector link, and means in said one finder-connector link operated in response to receipt of said marking from said selected trunk circuit for releasing the said one finder-connector link from said connection with said subscriber line.

2. In a telephone system, subscriber lines each having an associated line circuit, finder-connector links, trunk circuits each having an associated trunk finder, a group of conductors individual to each said line circuit having an extra control conductor included therein, said conductor groups each being connected to the banks of said links and to the banks of said trunk finders, means responsive to the initiation of a call by a calling subscriber line for operating one of said links to find and connect with the calling line over said associated group of conductors, a trunk circuit allotter, an allotter start conductor, a source of potential in said one link, means for directively operating said one link under control of said calling subscriber line for extending said potential to said allotter over said start conductor and for connecting said potential to mark the said extra control conductor of said associated calling line's line circuit in the banks of said trunk finders, said allotter operated responsive to receipt of said potential for selecting an idle trunk circuit for use, means in said selected trunk circuit operated responsive to said selection for automatically operating said associated trunk finder to hunt for and connect with the particular conductor group having the marked extra control conductor, whereby said selected trunk circuit is connected with the associated line circuit of said calling subscriber line, means in said trunk circuit operated responsive to said associated trunk finder connecting with said particular group of conductors for extending the marking potential encountered on said extra control conductor back to said one link over a different conductor of said particular group, and means in one link operated responsive to receipt of said returned marking potential for releasing said one link from said connection.

3. In a telephone system, subscriber lines, automatic switches having access to said lines, means responsive to the initiation of a call by a calling one of said lines for automatically operating one of said switches to hunt for and connect with said one calling line, trunk circuits each having an associated trunk finder, a vertical bank and a rotary bank individual to each of said trunk finders, a trunk circuit allotter, a start circuit for said allotter, means for directively operating said one switch in a single direction under control of said one calling line, a source of marking potential in said one switch, means responsive to the completion of said single direction operation for connecting said marking to said allotter start circuit and for extending said marking to said vertical and said rotary banks, said allotter operated responsive to said connection of said marking to said start circuit for selecting an idle trunk circuit for use, means responsive to said selection of said trunk circuit for automatically operating said associated trunk finder to hunt for and connect with said marking in said vertical bank, means responsive to said trunk finder connecting with said marking on said vertical bank for automatically operating said trunk finder to hunt for and connect with said marking on said rotary bank, means operated responsive to said marking on said rotary bank being connected with for extending said marking back to said one switch, and means in said one switch operated responsive to receipt of said returned marking for releasing said switch from said connection with said one calling line.

4. In a telephone system, a calling subscriber line, an automatic switch having access to said line, means responsive to the initiation of a call by said calling line for automatically operating said switch to hunt for and connect with said line, a trunk circuit, a trunk finder associated with said trunk circuit also having access to said line, a vertical bank and a rotary bank individual to said trunk finder, means for directively operating said automatic switch in a single motion under control of said calling line, a source of marking potential in said switch, means responsive to the completion of said single motion operation of said switch for extending said marking to said vertical and said rotary banks, means for automatically operating said trunk finder subsequent to said extension of said marking to said banks to hunt for and connect with said marking on said vertical bank, means responsive to said trunk finder connecting with said marking on said vertical bank for automatically operating said trunk finder to hunt for and connect with said marking on said rotary bank, means responsive to said marking on said rotary bank being connected with for extending said marking back to said switch, and means in said switch operated in response to receipt of said returned marking for releasing said switch from said connection with said calling line.

5. In a telephone system, a subscriber line, a line circuit associated with said line, an automatic switch, means responsive to the initiation of a call by said subscriber line for automatically operating said switch to connect with said line by way of said line circuit, a trunk circuit having an associated trunk finder, said trunk finder having access to said line by way of said line circuit, a vertical bank and a rotary bank individual to said trunk finder, a normally incomplete circuit extending to said vertical bank and a normally incomplete circuit extending to said rotary bank from said line circuit, means for directively operating said automatic switch in a single motion under control of said calling line, a source of marking potential in said switch, means responsive to the completion of said single motion operation of said switch for connecting said marking potential to said normally incomplete circuit, whereby said circuits are completed by extending said marking to said vertical bank and to said rotary bank, means for automatically operating said trunk finder subsequent to said extension of said marking to said banks to hunt for and connect with said marking on said vertical bank, means responsive to said trunk finder connecting with said marking on said vertical bank for automatically operating said trunk finder to hunt for and connect with said marking on said rotary bank, means responsive to said marking on said rotary bank being connected with for extending said marking back to said switch, and means in said switch operated in response to receipt of said returned marking for releasing said switch from said connection with said calling line.

6. In a telephone system, an automatic switch, a trunk circuit having an associated trunk finder, a subscriber line having an associated line circuit terminating in banks of said automatic switch and in banks of said trunk finder, means responsive to the initiation of a call by said subscriber line for automatically operating said switch to hunt for and connect with said calling line over said line circuit, an extra control conductor included in the connection extending between the banks of said switch and said line circuit of said calling line, a vertical bank and an extra control bank individual to said trunk finder, a pair of conductors connected in multiple at the juncture of the connection of said extra control conductor from said switch with said line circuit of said calling line, one of said conductors of said pair extending to said vertical bank and the other said conductor of said pair extending to said extra control bank of said trunk finder, means for directively operating said switch in a single direction under control of said calling line, a source of marking potential in said switch, means responsive to the completion of said single direction operation of said switch for applying said marking potential to said extra control conductor of said connection, whereby said marking is simultaneously extended over said multiple connection and said pair of conductors to mark the line circuit of said calling line in the vertical and extra control banks of said trunk finder, means for selecting said trunk circuit for use, means responsive to said trunk circuit being selected for automatically operating said associated trunk finder to hunt for and connect with said marking on said vertical bank, means responsive to said trunk finder connecting with said marking on said vertical bank for automatically operating said trunk finder to hunt for and connect with said marking on said extra control bank, means operated responsive to said trunk finder connecting with said marking on said extra control bank for extending said marking back to said switch, and means in said switch operated responsive to receipt of said returned marking for releasing said switch from said connection with said calling line.

7. In a telephone system, a calling subscriber line, a line circuit associated with said line, an automatic switch, means responsive to the initiation of a call by said calling line for automatically operating said switch to hunt for and connect with said calling line by way of said line circuit, a trunk circuit, a trunk finder associated with said trunk circuit also having access to said line by way of said line circuit, a vertical bank and a rotary bank individual to said trunk finder, a first circuit extending to said vertical bank and a second circuit extending to said rotary bank from a common point in said line circuit, means for directively operating said switch in a single motion under control of said calling line, a source of marking potential in said switch, an extra control conductor in said switch connected to said common point in said line circuit at the time said line circuit is connected with by said switch, normal post springs operated responsive to the completion of said single motion operation of said switch, circuit means completed in response to said operation of said normal post springs for connecting said marking potential to said extra control conductor, whereby said marking is extended to said vertical and said rotary banks of said trunk finder over the respective said first and second circuits, means for selecting said trunk circuit for use, means responsive to said selection of said trunk circuit for automatically operating said associated trunk finder to hunt for and connect with said marking on said vertical bank, means responsive to said trunk finder connecting with said marking on said vertical bank for automatically operating said trunk finder to hunt for and connect with said marking on said rotary bank, means responsive to said marking on said rotary bank being connected with for extending said marking back to said switch, and means in said switch operated in response to receipt of said returned marking for releasing said switch from said connection with said calling line.

8. A telephone system such as claimed in claim 7, wherein said means for extending said marking back to said switch comprises a switching relay, a circuit for operating said switching relay, said circuit being completed responsive to said connection with said marking on said rotary bank by said trunk finder, a pair of line conductors extending from said trunk circuit and associated trunk finder to said switch by way of said line circuit, and means controlled by said operation of said switching relay for connecting the said connected marking on said rotary bank to one of said pair of line conductors to thereby return said marking to said switch.

9. In a telephone system such as claimed in claim 7, wherein said means operated in response to receipt of said returned marking for releasing said switch from said connection comprises, a control relay, a circuit for operating said control relay, other normal post springs also operated responsive to said completion of said single motion operation of said switch for preparing a point in said operating circuit of said control relay, means for extending said returned marking to said operating circuit of said control relay for operating said control relay, normally operated holding means for maintaining said switch connected with said calling line, means controlled by said operation of said control relay for restoring said normally operated holding means, and means controlled responsive to the restoring of said holding means for releasing said switch from said connection with said calling line.

10. In a telephone system, local subscriber lines, automatic switches having access to said subscriber lines, two-way trunk circuits for extending incoming and outgoing trunk calls, a trunk finder individual to each of said trunk circuits, means responsive to the initiation of a call by one of said lines for operating one of said switches to hunt for and connect with said one calling line, contact banks individual to each of said trunk finders and terminating connections from said local subscriber lines, a distant exchange, means responsive to the initiation of an outgoing trunk call by said calling line for operating said one switch in a single directive movement, a source of marking potential in said one switch, means responsive to the completion of said single movement of said switch for extending said marking by way of said connection of said switch with said calling line for marking contacts in said trunk finder banks representing said calling line, means for selecting an idle one of said trunk circuits for use, means for operating said individual trunk finder of the said selected trunk circuit in response to said selection to hunt for and connect with the said marked contacts in said bank, whereby said calling line is connected with by said trunk finder, means in said trunk circuit operated responsive to receipt of said marking at the time of said connection with said marked contacts for extending said marking back to said one switch, means in said one switch operated responsive to receipt of said returned marking for releasing said switch from said connection with said calling line, and means in said trunk circuit operated under direct control of said calling subscriber for extending said desired trunk call to said distant exchange.

11. A telephone system such as claimed in claim 10, including dialling means at each of said local subscriber lines for transmitting digital impulses, means in said one trunk circuit operated in response to receipt of a single train of impulses dialled by said one calling line for placing a holding condition on the portion of said trunk circuit extending to said distant exchange, an inquiry circuit, other means in said trunk circuit operated in response to receipt of said single train of impulses for seizing said inquiry circuit, trunk finding means in said inquiry circuit operated responsive to said seizure for hunting for and connecting with said trunk circuit, each of said automatic switches consisting of a connector portion, connector finding means in said inquiry circuit also operated responsive to said seizure for hunting for and connecting with the connector portion of an idle one of said switches, means in said connector portion directively operated responsive to said one calling line operating said dialling means for extending a talking connection from said one calling line to a called one of said lines by way of said inquiry circuit and means responsive to said called line disconnecting from said talking connection for removing said holding condition to re-establish said outgoing trunk call between said calling line and said distant exchange.

12. A telephone system such as claimed in claim 11, including control marking in said connector portion of said switch, means in said connector portion operated responsive to receipt of a single train of impulses dialled by said called line, subsequent to said calling line disconnecting from said talking connection in case said calling line desires to transfer said outgoing trunk call to said called line, for extending said control marking from said connector to said inquiry circuit and to said trunk circuit by way of said inquiry circuit, a called line marking circuit, means operated responsive to said operation of said connector by said single dialling operation of said called line for preparing said called line marking circuit for extension to said trunk finder banks, means controlled by said inquiry circuit in response to receipt of said control marking for completing said called line marking circuit to mark contacts in said trunk finder bank representing said called line, release means in said trunk circuit operated responsive to receipt of said control marking for restoring said trunk finder portion to normal, means in said trunk circuit operated responsive to said trunk finder portion restoring to normal for re-operating said trunk finder to hunt for and connect with said marked bank contacts representing said called line, whereby said means is operated to remove said holding condition on said portion of said trunk circuit and said called line is connected to said established outgoing trunk call.

13. In a telephone system, a plurality of local subscriber lines, dialling means at each of said subscriber lines for transmitting digital impulses, a plurality of trunk circuits connected with a distant exchange, a hold circuit in each said trunk circuit, means for connecting one of said trunk circuits with one of said subscriber lines responsive to an outgoing trunk call being initiated by said one subscriber line, means for therefore establishing said outgoing trunk call, means responsive to a single operation of said dialling means by said one subscriber for splitting said connected trunk line into two sections and for completing said hold circuit across one of said sections to hold said outgoing trunk call, means for thereafter completing a local connection between said one subscriber line and another subscriber line by way of the other section of said trunk circuit, and means responsive to a single operation of said dialling means by said other subscriber, after said one subscriber has disconnected from said local connection, for connecting said other subscriber line with said one trunk circuit, for removing said holding circuit from said one section and reconnecting said split sections, and for connecting said other subscriber line to said established outgoing trunk call.

No references cited.